(12) United States Patent
Wada et al.

(10) Patent No.: US 11,326,695 B2
(45) Date of Patent: May 10, 2022

(54) METAL GASKET

(71) Applicant: NIPPON LEAKLESS INDUSTRY CO., LTD., Tokyo (JP)

(72) Inventors: Kazuya Wada, Saitama (JP); Shinichi Hirayama, Saitama (JP); Akinori Sueyoshi, Saitama (JP); Ryosuke Muraoka, Saitama (JP)

(73) Assignee: NIPPON LEAKLESS INDUSTRY CO., LTD., Saitama (JP)

( * ) Notice: Subject to any disclaimer, the term of this patent is extended or adjusted under 35 U.S.C. 154(b) by 230 days.

(21) Appl. No.: 16/482,431

(22) PCT Filed: Dec. 8, 2017

(86) PCT No.: PCT/JP2017/044218
§ 371 (c)(1),
(2) Date: Jul. 31, 2019

(87) PCT Pub. No.: WO2018/154918
PCT Pub. Date: Aug. 30, 2018

(65) Prior Publication Data
US 2020/0003308 A1      Jan. 2, 2020

(30) Foreign Application Priority Data
Feb. 22, 2017 (JP) .............................. JP2017-031389

(51) Int. Cl.
*F16J 15/10*      (2006.01)
*F02F 11/00*     (2006.01)
*F16J 15/12*      (2006.01)

(52) U.S. Cl.
CPC ........... *F16J 15/104* (2013.01); *F02F 11/002* (2013.01); *F16J 15/122* (2013.01)

(58) Field of Classification Search
CPC ........ F16J 15/104; F16J 15/122; F02F 11/002
See application file for complete search history.

(56) References Cited

U.S. PATENT DOCUMENTS 9,121,489 B1 *    9/2015  Tosa ..................... F16J 15/0818
9,841,103 B2 *  12/2017  Watanabe .............. F16J 15/122
(Continued)

FOREIGN PATENT DOCUMENTS

DE        19809755 A1   9/1999
JP        H0362264 U    6/1991
(Continued)

OTHER PUBLICATIONS

Jan. 19, 2021, Office Action issued by the Directorate General of Intellectual Property (DGIP) Ministry of Law and Human Rights in the corresponding Indonesian Patent Application No. PID201906999.

(Continued)

*Primary Examiner* — Eugene G Byrd
(74) *Attorney, Agent, or Firm* — Kenja IP Law PC

(57) ABSTRACT

A metal gasket (10) installed between a cylinder head and a cylinder block comprises at least one metal substrate (11) coated with a sealant (19) on its outer surface, and including a full bead (13) for cylinder bore hole sealing and a half bead (16) for liquid hole sealing. The half bead (16) includes: an inclined plate portion (16b) connected to a flat substrate body (11a) of the metal substrate (11) through a first bend portion (16a) and inclined with respect to the substrate body (11a); and an edge plate portion (16d) connected to the inclined plate portion (16b) through a second bend portion (16c) and inclined with respect to the inclined plate portion (16b). A radius at a convex surface of the first bend portion (16a) and a radius at a concave surface of the second bend portion (16c) are in a range of 2.0 mm to 3.5 mm.

3 Claims, 13 Drawing Sheets

(56) References Cited

U.S. PATENT DOCUMENTS

| | | | |
|---|---|---|---|
| 2002/0000696 A1* | 1/2002 | Okazaki | F16J 15/0818 277/592 |
| 2005/0115311 A1* | 6/2005 | Kestly | F16J 15/0825 73/114.18 |
| 2014/0097576 A1* | 4/2014 | Hirayama | F02F 11/002 277/591 |
| 2015/0069719 A1* | 3/2015 | Hu | F16J 15/0818 277/593 |
| 2015/0204270 A1* | 7/2015 | Davidson | F16J 15/0818 277/593 |

FOREIGN PATENT DOCUMENTS

| | | | | |
|---|---|---|---|---|
| JP | H0495668 | A | | 3/1992 |
| JP | H06117542 | A | | 4/1994 |
| JP | 10281289 | A | * | 10/1998 |
| JP | H10281289 | A | | 10/1998 |
| JP | 2004308761 | A | * | 11/2004 ............ F16J 15/122 |
| JP | 2005315419 | A | | 11/2005 |
| JP | 2006523287 | A | | 10/2006 |
| JP | 2008038733 | A | | 2/2008 |
| JP | 2012082851 | A | | 4/2012 |
| JP | 2014119075 | A | | 6/2014 |
| JP | 2015129572 | A | * | 7/2015 ............ F16J 15/0825 |
| JP | 2016169797 | A | | 9/2016 |
| KR | 1020070043609 | A | | 4/2007 |
| KR | 1020130134069 | A | | 12/2013 |
| KR | 101376740 | B1 | | 3/2014 |

OTHER PUBLICATIONS

Oct. 2, 2019, Notice of Reasons for Revocation issued by the Japan Patent Office in the corresponding Japanese Patent No. 6453369.
Mar. 13, 2018, International Search Report issued in the International Patent Application No. PCT/JP2017/044218.
Sep. 18, 2018, Notice of Reasons for Refusal issued by the Japan Patent Office in the corresponding Japanese Patent Application No. 2017-031389.
Mar. 12, 2020, Ruling on the Patent Opposition issued by the Japan Patent Office in the corresponding Japanese Patent No. 6453369 with a partial English translation.
Nov. 30, 2020, Office Action issued by the China National Intellectual Property Administration in the corresponding Chinese Patent Application No. 201780085694.5.
Aug. 27, 2019, International Preliminary Report on Patentability issued in the International Patent Application No. PCT/JP2017/044218.
May 20, 2021, Office Action issued by the Intellectual Property India in the corresponding Indian Patent Application No. 201917030988.

* cited by examiner

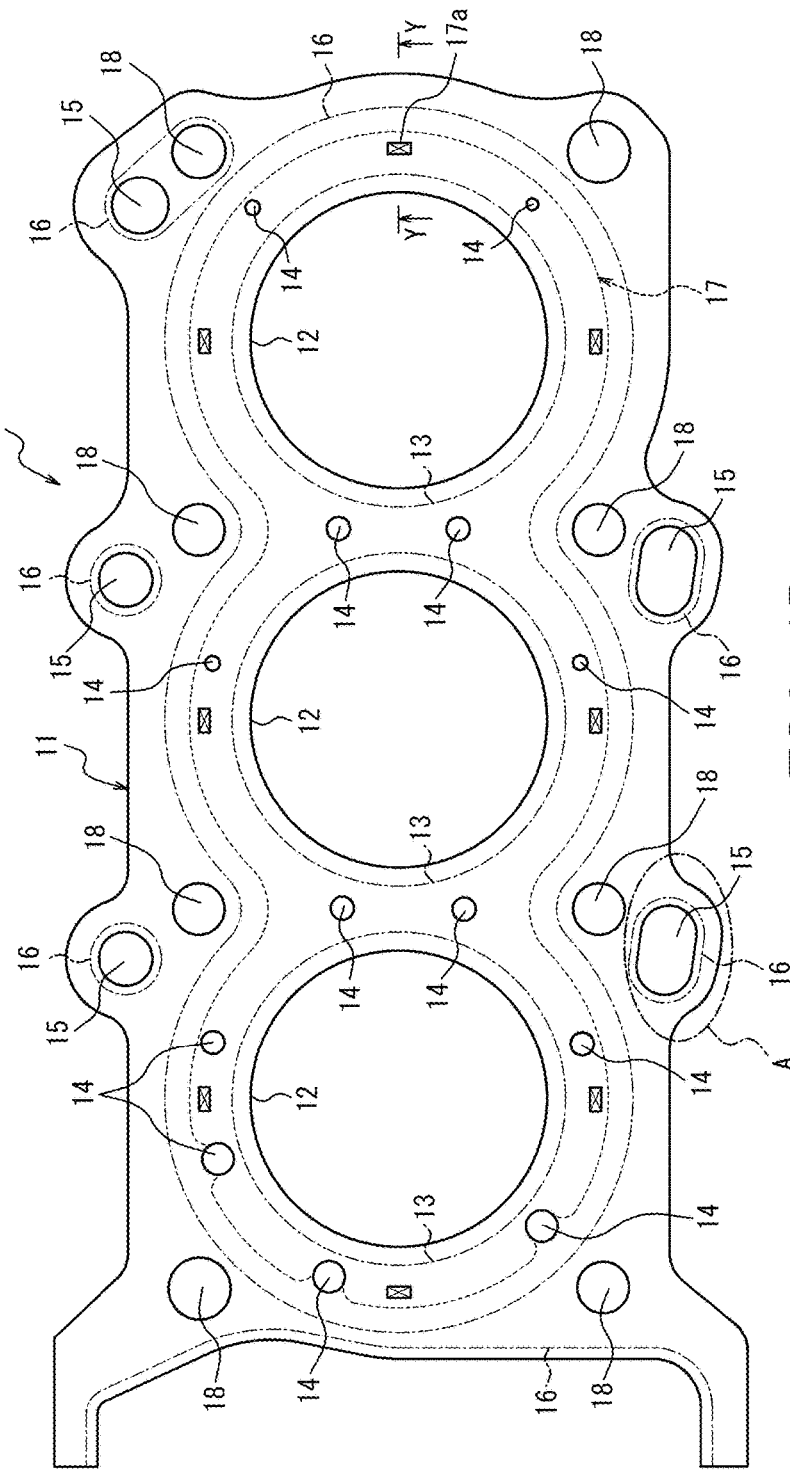
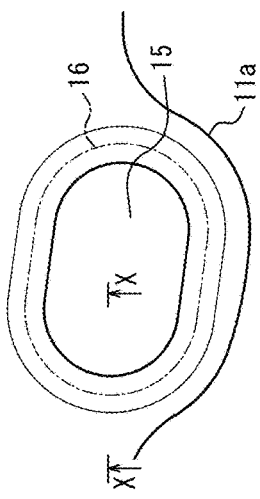
FIG. 1A
FIG. 1B

METAL GASKET

TECHNICAL FIELD

The present disclosure relates to a metal gasket that is installed between a cylinder block and a cylinder head of an internal combustion engine (engine) to prevent leakage of combustion gas and leakage of a liquid such as cooling water or lubricating oil. The present disclosure particularly relates to a metal gasket including a full bead for cylinder bore hole sealing and a half bead for liquid hole sealing.

BACKGROUND

In an internal combustion engine, a metal gasket is installed between a cylinder block and a cylinder head to prevent leakage of high pressure combustion gas from a cylinder bore hole and prevent leakage of a liquid such as cooling water or lubricating oil (oil) from a liquid hole such as a cooling water hole (water jacket) or a lubricating oil hole. As such a metal gasket, a structure in which a metal substrate made of an elastic metal plate such as stainless steel material is provided with a full bead for cylinder bore hole sealing that surrounds a cylinder bore hole and a half bead for liquid hole sealing that surrounds a liquid hole is known.

In recent years, the pressure of combustion gas has been increased with an increase in the output of internal combustion engines. Hence, many metal gaskets with enhanced sealing performance particularly against leakage of combustion gas from a cylinder bore hole have been developed.

For example, PTL 1 discloses a metal gasket having one metal substrate including a full bead for cylinder bore hole sealing and a half bead for liquid hole sealing, wherein a level difference adjusting plate is fixed on the cylinder bore hole side so as to be superposed on the full bead, to make the thickness different between the full bead side and the half bead side. When this metal gasket is installed between the cylinder block and the cylinder head and the cylinder head is fastened with a fastening bolt, a greater fastening force can be applied to the full bead side on which the level difference adjusting plate is superposed than on the half bead side. Thus, the surface pressure of the full bead is considerably increased relative to the surface pressure of the half bead to facilitate the full bead compression effect, with it being possible to enhance sealing performance against leakage of combustion gas. Moreover, since the half bead side of the metal gasket can be formed by one metal substrate, weight reduction required in terms of engine design, heat conductivity improvement, compression ratio adjustment, cost reduction, and the like can be achieved while enhancing sealing performance against combustion gas.

As such metal gaskets, a structure in which the outer surface of a metal substrate is coated with, as a sealant, rubber such as nitrile rubber (NBR) or fluororubber (FKM) with a predetermined film thickness in order to absorb tool marks on a cylinder block or a cylinder head caused by machining processing is also known (for example, see PTL 2).

CITATION LIST

Patent Literatures

PTL 1: JP 2014-119075 A
PTL 2: JP 2016-169797 A

SUMMARY

Technical Problem

In the conventional metal gasket described in PTL 1, the level difference adjusting plate is superposed on the full bead to direct much of the fastening force of the fastening bolt to the full bead. This stabilizes sealing performance against combustion gas in the long term, but causes a relative decrease in the fastening force on the half bead side for sealing the liquid hole through which the liquid such as cooling water or lubricating oil flows. Consequently, the compression of the half bead is incomplete. This leads to problems such as a decrease in sealing performance due to a decrease in the restoration force of the half bead, a decrease in sealing performance due to cracking of the half bead, and a decrease in sealing performance due to swelling and peeling of the sealant with which the outer surface is coated.

Detailed study on these problems revealed that the cause of the problems can be explained from a "head lift phenomenon" and the like. The "head lift phenomenon" is a mouth opening phenomenon in which the deck surface gap between the cylinder block and the cylinder head opens and closes in a range of several μm to a dozen μm by the combustion cycle that reaches as high as several thousand rotations per minute during output of the internal combustion engine. As a result of the mouth opening phenomenon acting on each half bead of the metal gasket as an alternating load, the half bead vibrates vertically and settles, and its restoration force decreases. The vertical vibration due to the mouth opening phenomenon also causes cracking by metal fatigue in part of each half bead. In the case where the compression of the half bead is complete, the mouth opening phenomenon is not very problematic. In the above-described conventional metal gasket, however, the compression of the half bead is incomplete although the combustion gas sealability is stabilized. Hence, the problems mentioned above arise due to the mouth opening phenomenon.

In the case where the outer surface of the metal substrate is coated with rubber or the like as a sealant, the vertical vibration of the half bead due to the mouth opening phenomenon causes swelling and peeling of the sealant. This half bead-related problem also needs to be solved.

It could therefore be helpful to provide a metal gasket including a half bead that can maintain its sealing function even when compressed incompletely.

Solution to Problem

A metal gasket according to the present disclosure is a metal gasket configured to be installed between a cylinder head and a cylinder block, the metal gasket comprising at least one metal substrate coated with a sealant on an outer surface thereof, and including a full bead for cylinder bore hole sealing and a half bead for liquid hole sealing, wherein the half bead includes: an inclined plate portion connected to a flat substrate body of the metal substrate through a first bend portion and inclined with respect to the substrate body; and an edge plate portion connected to the inclined plate portion through a second bend portion and inclined with respect to the inclined plate portion, and a radius at a convex surface of the first bend portion and a radius at a concave surface of the second bend portion are each in a range of 2.0 mm to 3.5 mm.

Preferably, in the metal gasket according to the present disclosure, a height of the half bead is in a range of 0.35 mm to 0.85 mm.

Preferably, in the metal gasket according to the present disclosure, a width of the half bead is in a range of 1.2 mm to 1.8 mm.

Advantageous Effect

It is thus possible to provide a metal gasket including a half bead that can maintain its sealing function even when compressed incompletely.

BRIEF DESCRIPTION OF THE DRAWINGS

In the accompanying drawings:

FIG. 1A is a plan view illustrating a metal gasket according to one of the disclosed embodiments;

FIG. 1B is an enlarged view illustrating a range A in FIG. 1A;

DETAILED DESCRIPTION

Figure 2:
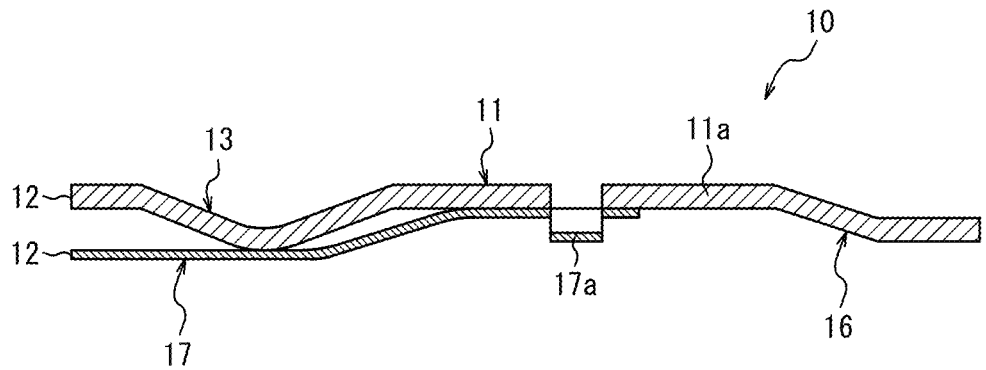
FIG. 2 is a sectional view along Y-Y line in FIG. 1A.

The presently disclosed techniques will be described in more detail below, with reference to drawings.

A metal gasket 10 according to one of the disclosed embodiments illustrated in FIG. 1A is installed between a cylinder block and a cylinder head of an internal combustion engine (engine) (not illustrated) to prevent leakage of combustion gas and leakage of a liquid such as cooling water or lubricating oil. The metal gasket 10 includes one metal substrate 11. The metal substrate 11 is provided with full beads 13 for cylinder bore hole sealing each for preventing leakage of combustion gas from a cylinder bore hole 12 and half beads 16 for liquid hole sealing each for preventing leakage of cooling water or lubricating oil from a cooling water hole (liquid hole) 14 or a lubricating oil hole (liquid hole) 15.

As illustrated in FIG. 2, the metal gasket 10 has a main structure in which a level difference adjusting plate 17 is superposed on the full bead 13 on the cylinder bore hole 12 side of the metal substrate 11 and fixed by a caulking portion 17a in the part of the cooling water hole 14. When the metal gasket 10 having such a main structure is installed between the cylinder block and the cylinder head and the cylinder head is fastened with fastening bolts, a greater fastening force is applied to the full bead 13 side on which the level difference adjusting plate 17 is superposed than on the half bead 16 side. Thus, the surface pressure of the full bead 13 is considerably increased relative to the surface pressure of the half bead 16 to facilitate the compression effect for the full bead 13, with it being possible to enhance sealing performance against leakage of combustion gas. Moreover, since the half bead 16 side of the metal gasket 10 can be formed by one metal substrate 11, weight reduction required in terms of engine design, heat conductivity improvement, compression ratio adjustment, cost reduction, and the like can be achieved while enhancing sealing performance against combustion gas. Reference sign 18 in FIG. 1A is a bolt hole through which a bolt for fixing the cylinder head to the cylinder block is inserted.

Figure 3A:
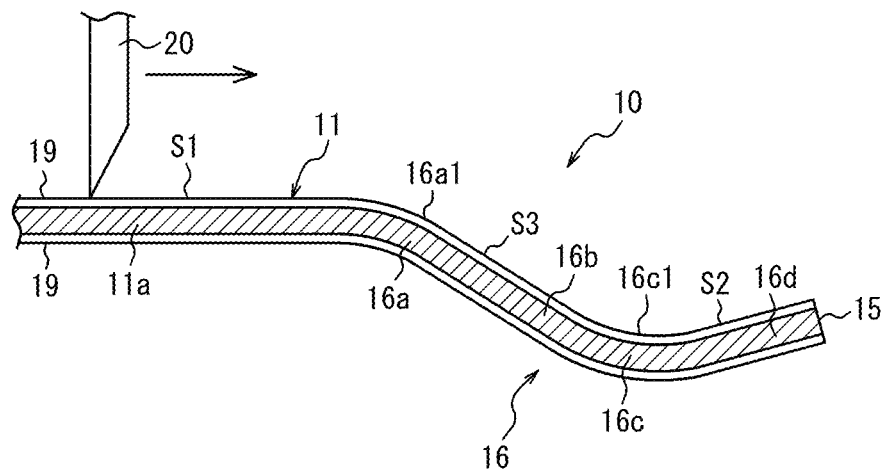
FIG. 3A is a sectional view along X-X line in FIG. 1B.

As illustrated in FIG. 3A, the half bead 16 surrounding the lubricating oil hole 15 has a single-slope cross-sectional shape including: an inclined plate portion 16b connected to a flat substrate body 11a through a first bend portion 16a and inclined downward with respect to the substrate body 11a; and an edge plate portion 16d connected to the inclined plate portion 16b through a second bend portion 16c and inclined upward with respect to the inclined plate portion 16b. The convex surface of the first bend portion 16a is a part that, when the metal substrate 10 is installed between the cylinder head and the cylinder block, comes into contact with the deck surface of one of the cylinder head and the cylinder block and forms a sealing line of the half bead 16. The convex surface of the second bend portion 16c is a part that, when the metal substrate 10 is installed between the cylinder head and the cylinder block, comes into contact with the deck surface of the other one of the cylinder head and the cylinder block and forms a sealing line of the half bead 16.

The outer surface (both the front and the back) of the metal substrate 11 is coated with a sealant 19 made of rubber such as nitrile rubber (NBR) or fluororubber (FKM) in a thin film. By coating the outer surface of the metal substrate 11 with the sealant 19, tool marks on the cylinder block or the cylinder head caused by machining processing can be absorbed to further enhance the sealing performance of the metal gasket 10.

Figure 3B:
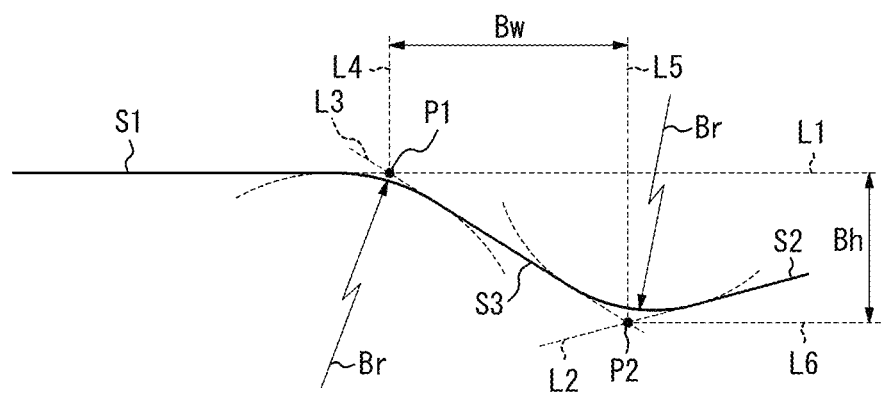
FIG. 3B is a line of plotting of the outer shape of the half bead measured by moving a probe called a single-angle stylus of a shape measuring instrument on the upper surface of the half bead in FIG. 3A in the arrow direction.

FIG. 3B is a line of plotting of the outer shape of the half bead 16 measured by moving a probe 20 called a single-angle stylus of a shape measuring instrument on the upper surface of the half bead 16 in FIG. 3A in the arrow direction. The direction of scanning by the probe 20 is the direction from the outer edge of the metal gasket 10 to the center of the lubricating oil hole 15.

The bead height Bh and the bead width Bw of the half bead 16 having a single-slope cross-sectional shape in FIG.

3A are defined as illustrated in FIG. 3B. In detail, let an extension line from the upper surface S1 of the flat substrate body 11a be a substrate body line L1, an extension line from the upper surface S2 of the edge plate portion 16d be an edge plate portion line L2, an extension line from the upper surface S3 of the inclined plate portion 16b be an inclined plate portion line L3, an intersection point of the substrate body line L1 and the inclined plate portion line L3 be an intersection point P1, and an intersection point of the edge plate portion line L2 and the inclined plate portion line L3 be an intersection point P2. The bead width Bw of the half bead 16 is the distance between the intersection points P1 and P2 in the direction along the substrate body line L1 (the distance between a vertical reference line L4 passing through the intersection point P1 and orthogonal to the substrate body line L1 and a line L5 passing through the intersection point P2 and parallel to the vertical reference line L4). The bead height Bh of the half bead 16 is the distance between the intersection points P1 and P2 in the direction perpendicular to the substrate body line L1 (the distance between a line L6 passing through the intersection point P2 and parallel to the substrate body line L1 and the substrate body line L1).

The bead radius Br at the convex surface (outer angle side surface) of the first bend portion 16a and the bead radius Br at the concave surface (inner angle side surface) of the second bend portion 16c of the half bead 16 having a single-slope cross-sectional shape in FIG. 3A are defined as illustrated in FIG. 3B.

In the metal gasket 10 according to one of the disclosed embodiments, the bead radius Br at the convex surface of the first bend portion 16a and the bead radius Br at the concave surface of the second bend portion 16c of the half bead 16 are each set in a range of 2.0 mm to 3.5 mm. With such a structure, the sealing limit value for the cooling water hole 14 or the lubricating oil hole 15 by the half bead 16 can be increased without causing "streak marks" at the surface of the sealant 19 on the concave surface of each of the first bend portion 16a and the second bend portion 16c, so that sufficient sealing function can be achieved even when the compression of the half bead 16 is incomplete.

In the metal gasket 10 according to one of the disclosed embodiments, the bead height Bh of the half bead 16 is preferably in a range of 0.30 mm to 0.85 mm. With such a structure, the sealing limit value for the cooling water hole 14 or the lubricating oil hole 15 by the half bead 16 can be increased without causing "streak marks" at the surface of the sealant 19 on the concave surface of each of the first bend portion 16a and the second bend portion 16c and without causing "fine cracks" at the convex surface of each of the first bend portion 16a and the second bend portion 16c, so that sufficient sealing function can be achieved even when the compression of the half bead 16 is incomplete.

In the metal gasket 10 according to one of the disclosed embodiments, the bead width Bw of the half bead 16 is preferably in a range of 1.2 mm to 1.8 mm. With such a structure, the sealing limit value for the cooling water hole 14 or the lubricating oil hole 15 by the half bead 16 can be further increased without causing "streak marks" at the surface of the sealant 19 on the concave surface of each of the first bend portion 16a and the second bend portion 16c and without causing "fine cracks" at the convex surface of each of the first bend portion 16a and the second bend portion 16c.

Figure 4:
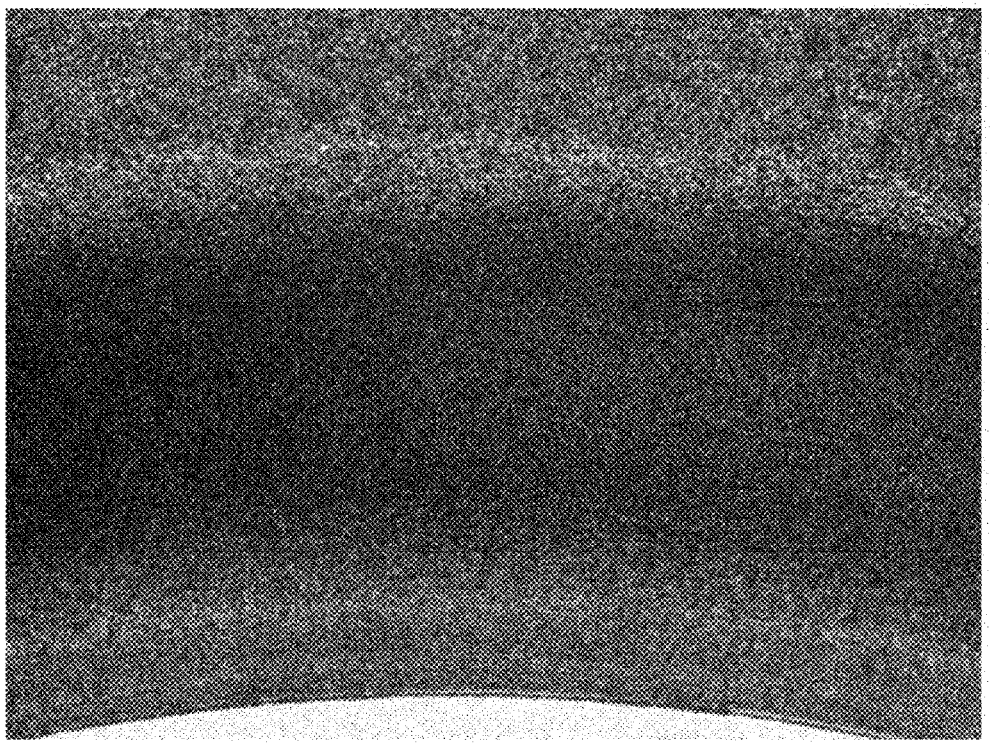
FIG. 4 is a sectional view illustrating the state of a sealant in a half bead part of the metal gasket according to one of the disclosed embodiments.

FIG. 4 is a sectional view illustrating the state of the sealant in the half bead part of the metal gasket according to one of the disclosed embodiments. As illustrated in FIG. 4, neither "fine cracks" nor "streak marks" occur at the surface of the sealant 19 in the part of the half bead 16 in the metal gasket 10 according to one of the disclosed embodiments.

Figure 5:
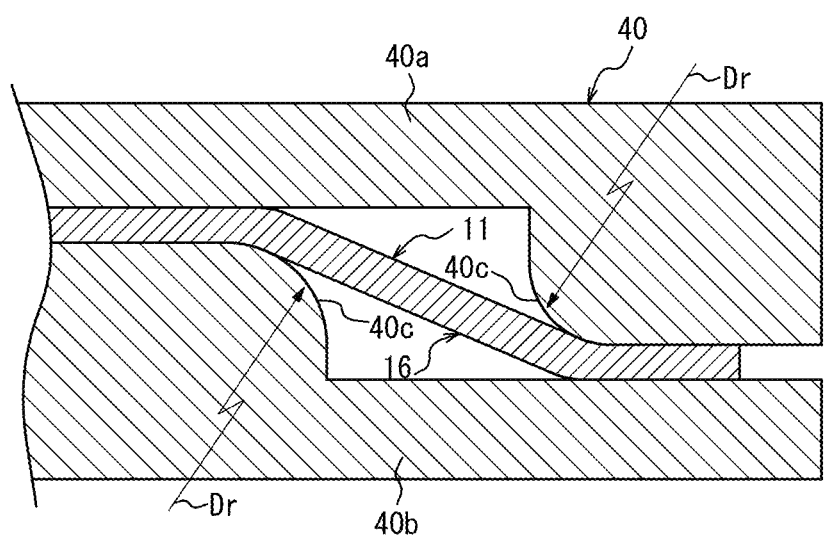
FIG. 5 is a schematic view illustrating press working of a metal substrate of the metal gasket according to one of the disclosed embodiments using a half bead mold.

FIG. 5 is a schematic view illustrating press working of the metal substrate of the metal gasket according to one of the disclosed embodiments using a half bead mold.

The half bead 16 of the metal gasket 10 according to one of the disclosed embodiments can be formed, for example, using a half bead mold 40 illustrated in FIG. 5. The half bead mold 40 includes an upper mold 40a and a lower mold 40b. A pair of chamfers 40c of the half bead mold 40 for forming the first bend portion 16a and the second bend portion 16c of the half bead 16 are, in a mold design stage, set as reliable round chamfering so that the bead radius Br at the convex surface of the first bend portion 16a and the bead radius Br at the concave surface of the second bend portion 16c are each in a range of 2.0 mm to 3.5 mm. By using the half bead mold 40 with such a structure, the half bead 16 having the bead radius Br in the foregoing numerical range can be formed easily and reliably.

How the foregoing structure (numerical range) of the metal gasket 10 according to one of the disclosed embodiments was derived will be described below.

Figure 6:
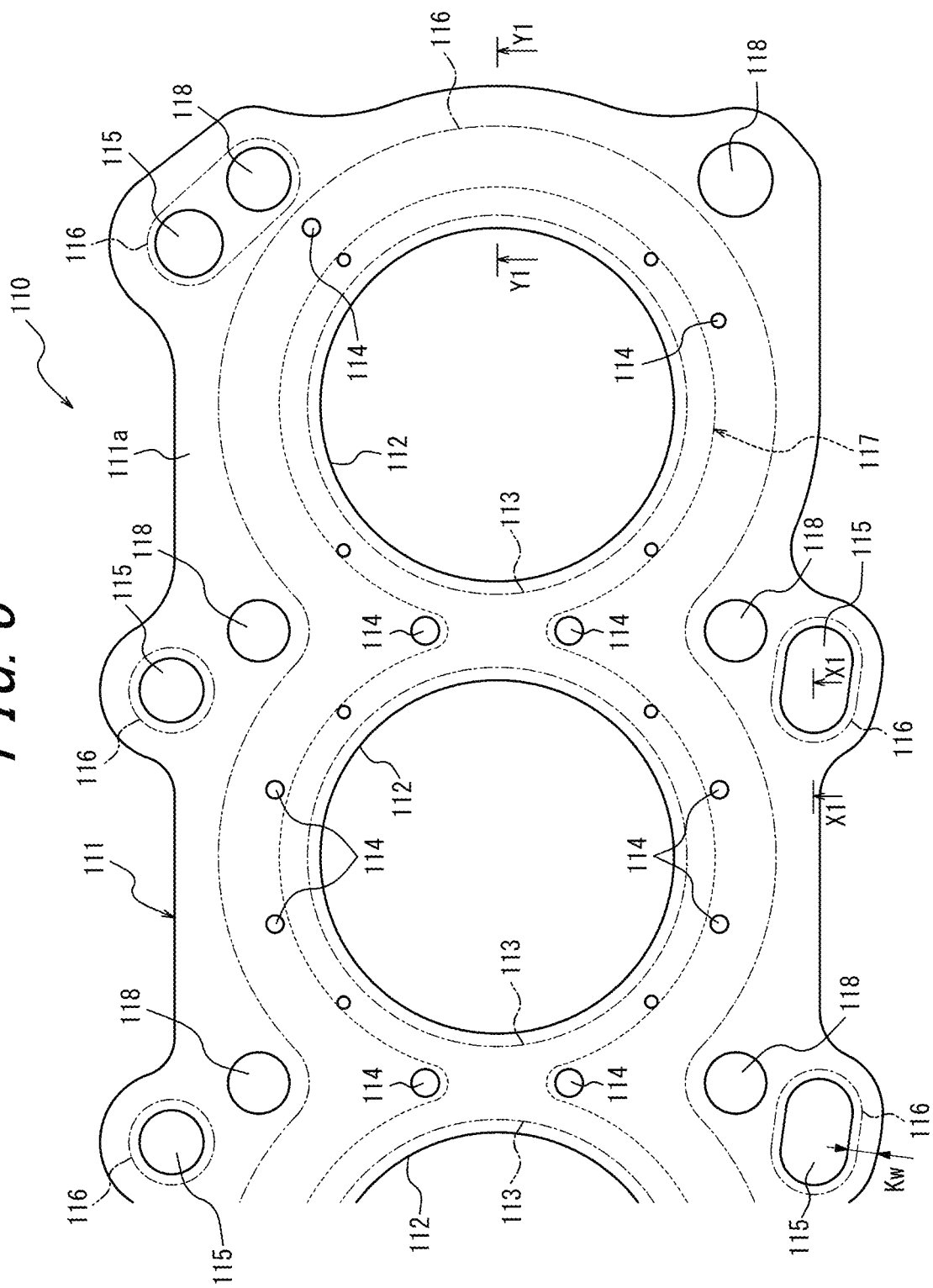
FIG. 6 is a plan view illustrating an example of a conventional metal gasket.
Figure 7:
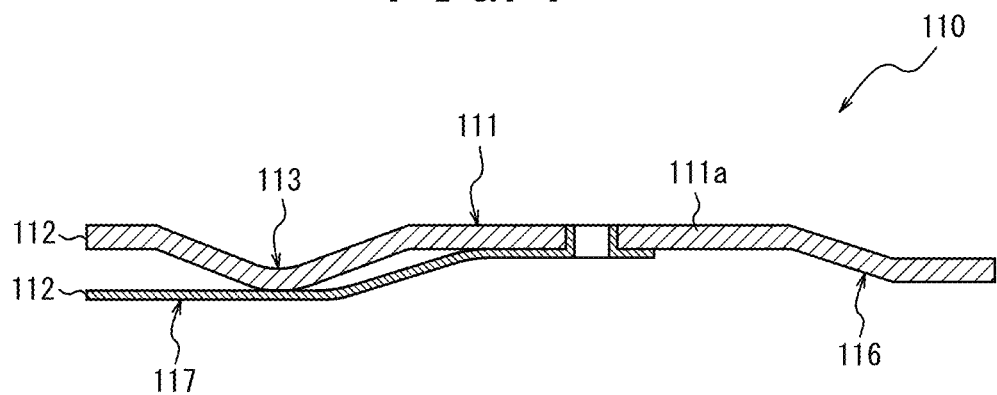
FIG. 7 is a sectional view along Y1-Y1 line in FIG. 6.
Figure 8:
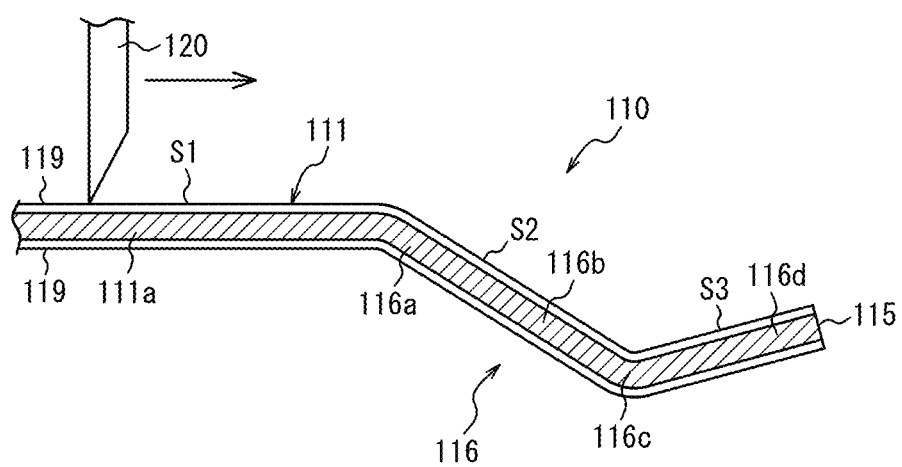
FIG. 8 is a sectional view along X1-X1 line in FIG. 6.

First, we examined the half bead in the conventional metal gasket including the level difference adjusting plate described in PTL 1. FIG. 6 is a plan view illustrating an example of the conventional metal gasket. FIG. 7 is a sectional view along Y1-Y1 line in FIG. 6. FIG. 8 is a sectional view along X1-X1 line in FIG. 6.

As illustrated in FIG. 6, a conventional metal gasket 110 includes a metal substrate 111. The metal substrate 111 is provided with full beads 113 for cylinder bore hole sealing each for preventing leakage of combustion gas from a cylinder bore hole 112 and half beads 116 each for preventing leakage of cooling water or lubricating oil from a cooling water hole (water jacket) 114 or a lubricating oil hole 115. As illustrated in FIG. 7, the metal gasket 110 has a main structure in which a level difference adjusting plate 117 is superposed and fixed on the full bead 113 on the cylinder bore hole 112 side of the metal substrate 111. The level difference adjusting plate 117 is superposed only on the full bead 113, and does not reach the half bead 116 side. Reference sign 118 in FIG. 6 is a bolt hole through which a bolt for fixing the cylinder head to the cylinder block is inserted.

As illustrated in FIG. 8, the half bead 116 surrounding the lubricating oil hole 115 has a single-slope cross-sectional shape including: an inclined plate portion 116b connected to a flat substrate body 111a through a first bend portion 116a and inclined downward with respect to the substrate body 111a; and an edge plate portion 116d connected to the inclined plate portion 116b through a second bend portion 116c and inclined upward with respect to the inclined plate portion 116b. The outer surface (both the front and the back) of the metal substrate 111 is coated with a sealant 119 such as rubber.

Figure 9A:
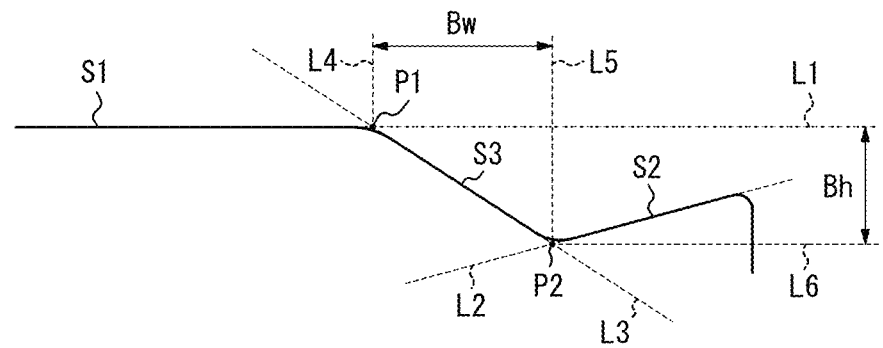
FIG. 9A is a line of plotting of the outer shape of the half bead measured by moving a probe called a single-angle stylus of a shape measuring instrument on the upper surface of the half bead in FIG. 8 in the arrow direction.
Figure 9B:
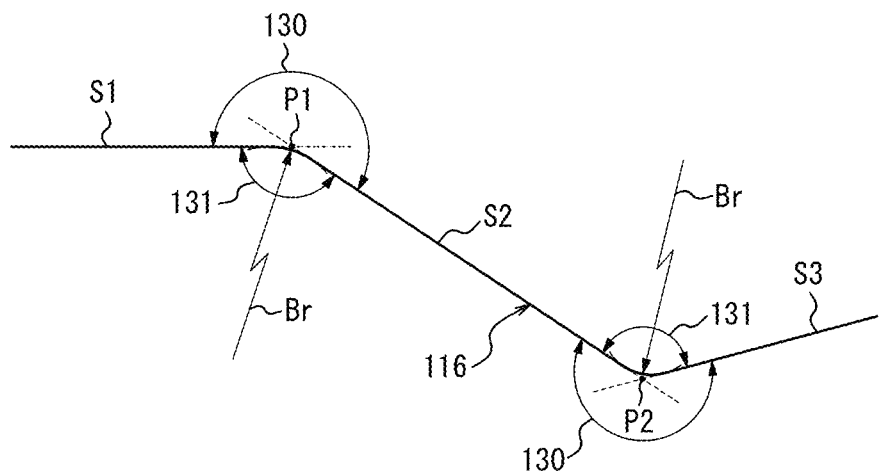
FIG. 9B is a principal part enlarged view of the line of plotting in FIG. 9A.

FIG. 9A is a line of plotting of the outer shape of the half bead measured by moving a probe called a single-angle stylus of a shape measuring instrument on the upper surface of the half bead in FIG. 8 in the arrow direction. FIG. 9B is a principal part enlarged view of the line of plotting in FIG. 9A.

The bead height Bh and the bead width Bw of the half bead 116 having a single-slope cross-sectional shape in FIG. 8 are defined as illustrated in FIG. 9A, based on the line of plotting of the outer shape of the half bead measured by moving a probe called a single-angle stylus of a shape measuring instrument on the upper surface of the half bead in FIG. 8 in the arrow direction. The direction of scanning by the probe in FIG. 8 is the direction from the outer edge of the metal gasket 110 to the center of the lubricating oil hole 115. In detail, let an extension line from the upper surface S1 of the flat substrate body 111*a* be a substrate body line L1, an extension line from the upper surface S2 of the edge plate portion 116*d* be an edge plate portion line L2, an extension line from the upper surface S3 of the inclined plate portion 116*b* be an inclined plate portion line L3, an intersection point of the substrate body line L1 and the inclined plate portion line L3 be an intersection point P1, and an intersection point of the edge plate portion line L2 and the inclined plate portion line L3 be an intersection point P2. The bead width Bw of the half bead 116 is the distance between the intersection points P1 and P2 in the direction along the substrate body line L1 (the distance between a vertical reference line L4 passing through the intersection point P1 and orthogonal to the substrate body line L1 and a line L5 passing through the intersection point P2 and parallel to the vertical reference line L4). The bead height Bh of the half bead 116 is the distance between the intersection points P1 and P2 in the direction perpendicular to the substrate body line L1 (the distance between a line L6 passing through the intersection point P2 and parallel to the substrate body line L1 and the substrate body line L1).

Figure 10:
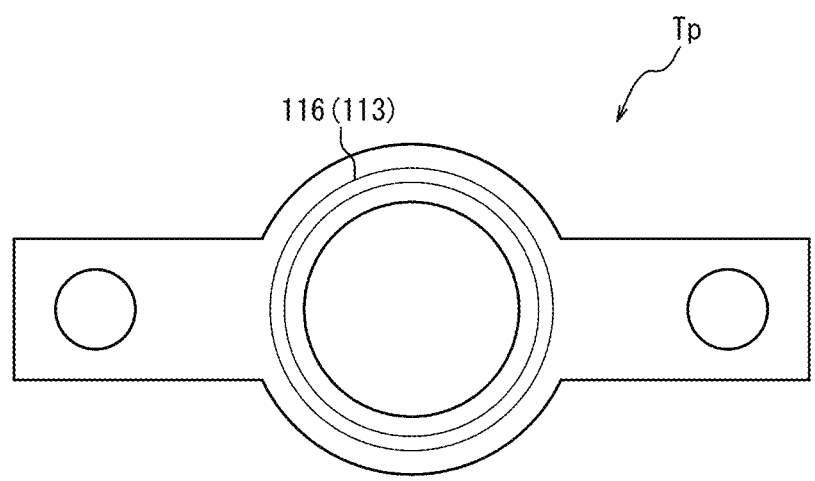
FIG. 10 is a plan view of a test piece.

To set the target value of the sealing limit value of the half bead 16 in the metal gasket 10 according to the present disclosure based on the sealing limit value of the half bead 116 in the conventional metal gasket 110, Comparative Example samples C1 to C12 each having the half bead 116 based on the shape of the half bead 116 in FIG. 9A were produced. Comparative Example samples C1 to C12 were each produced as a test piece Tp having a planar shape illustrated in FIG. 10. Comparative Example samples C1 to C12 were each formed using a typical SUS-301 steel plate for springs described in paragraph [0025] of the foregoing Cited Document 1, with its outer surface being coated with a sealant mainly made of NBR described in the foregoing Cited Document 2.

Comparative Example samples are classified into Gr. A, Gr. B, and Gr. C. Gr. A (Comparative Example samples C1 to C5) has a substrate thickness t of the metal substrate of 0.20 mm, a bead width Bw of 1.5 mm, and a bead height Bh changed from 0.25 mm to 0.65 mm. Gr. B (Comparative Example samples C6 to C9) has a substrate thickness t of the metal substrate of 0.25 mm, a bead width Bw of 1.5 mm, and a bead height Bh changed from 0.25 mm to 0.55 mm. Gr. C (Comparative Example samples C10 to C12) has a substrate thickness t of the metal substrate of 0.20 mm, a bead width Bw of 1.5 mm, a bead shape changed to the full bead 113 of a mountain-like slope shape same as the bead for cylinder bore hole sealing instead of the half bead 116 of Comparative Examples C1 to C9, and a bead height Bh changed from 0.25 mm to 0.45 mm. The bead height Bh corresponds to the bead height Bh of the half bead 116 in FIG. 9A. The bead width Bw corresponds to the bead width Bw of the half bead 116 in FIG. 9A.

In each of Comparative Example samples C1 to C12, the bead width Bw was set to 1.5 mm which is particularly common in a range of 1.0 mm to 2.0 mm typically used by a person skilled in the art, in relation to the width Kw (see FIG. 6) between the outer edge of the substrate body 111*a* and the inner edge of the lubricating oil hole 115 in the metal gasket 110. Moreover, in each of Comparative Example samples C1 to C12, the bead radius Br was set to 0.5 mm, as the bead radius Br of the half bead in the conventional metal gasket measured beforehand was 0.3 mm to 0.5 mm.

For Comparative Example samples C1 to C12, an experiment reproducing the head lift phenomenon (mouth opening phenomenon) was conducted using a sealing limit tester, and the sealing limit value was measured and whether cracks and streak marks occurred was evaluated.

The sealing limit tester used has an upper jig corresponding to the cylinder head and a lower jig corresponding to the cylinder block, and is capable of sandwiching, between the upper jig and the lower jig, a Comparative Example sample positioned by a guide pin and compressing Comparative Example sample C under a prescribed load using a universal tester (not illustrated in detail). A heater, a thermocouple for the heater, a gap sensor, each sensor of an oil pressure regulator, and the like are attached to the lower jig of the sealing limit tester, and an oil reservoir corresponding to the inner diameter of Comparative Example sample C is formed in a concave shape in the lower jig. The oil reservoir can be supplied with lubricating oil (oil) from an oil pressure regulator at a prescribed oil pressure.

The sealing ability of the metal gasket is an ability of handling the head lift phenomenon which occurs during output of the internal combustion engine, i.e. the mouth opening phenomenon between the cylinder head and the cylinder block. Accordingly, the following method was employed to reproduce the mouth opening phenomenon: A Comparative Example sample for the test was sandwiched between the upper jig corresponding to the cylinder head and the lower jig corresponding to the cylinder block and compressed under a prescribed load to be fastened, and then the distance between Comparative Example sample C and the two jigs was increased while forcibly decreasing the fastening load of the Comparative Example sample between the two jigs. This is based on the supposition that the sealing performance of the half bead can be evaluated by determining the relationship between the mouth opening amount (μm), i.e. the amount of the mouth opening phenomenon from initial compression, and whether leakage (loss) of lubricating oil occurs. Specifically, the compression load applied to the half bead when the metal gasket was installed in an actual engine and the cylinder head was fastened to the cylinder block by bolts was investigated, and the upper limit compression load was set to 1200 kg. The Comparative Example sample was sandwiched between the upper jig and the lower jig and compressed, with the compression upper limit load of a universal tester used for the sealing limit tester being set as this value. When the pressing load of the universal tester reached the upper limit compression load, the output values of the two right and left gap sensors were set to 0. Subsequently, the oil pressure of the oil pressure generator was set to a prescribed pressure (0.5 MPa), and the inside (oil reservoir) of the Comparative Example sample was filled with lubricating oil pressurized to the prescribed pressure, after which the pressing load of the universal tester was gradually reduced in pressure from the upper limit compression load. When the pressing load of the universal tester was gradually reduced in pressure, the upper jig ascended and the surface pressure of the half bead decreased. Once the pressing load of the universal tester decreased to a certain value, a gap formed between the Comparative Example sample and the lower jig, and the lubricating oil flew out of the half bead. The gap (μm) between the Comparative Example sample and the lower jig was measured from the output value of the gap sensor when the lubricating oil flew out, and taken to be a "sealing limit value".

The sealing limit tester is not limited to the above-described structure as long as it is capable of an experiment reproducing the head lift phenomenon (mouth opening phenomenon), and any other device or method may be used.

Figure 11:
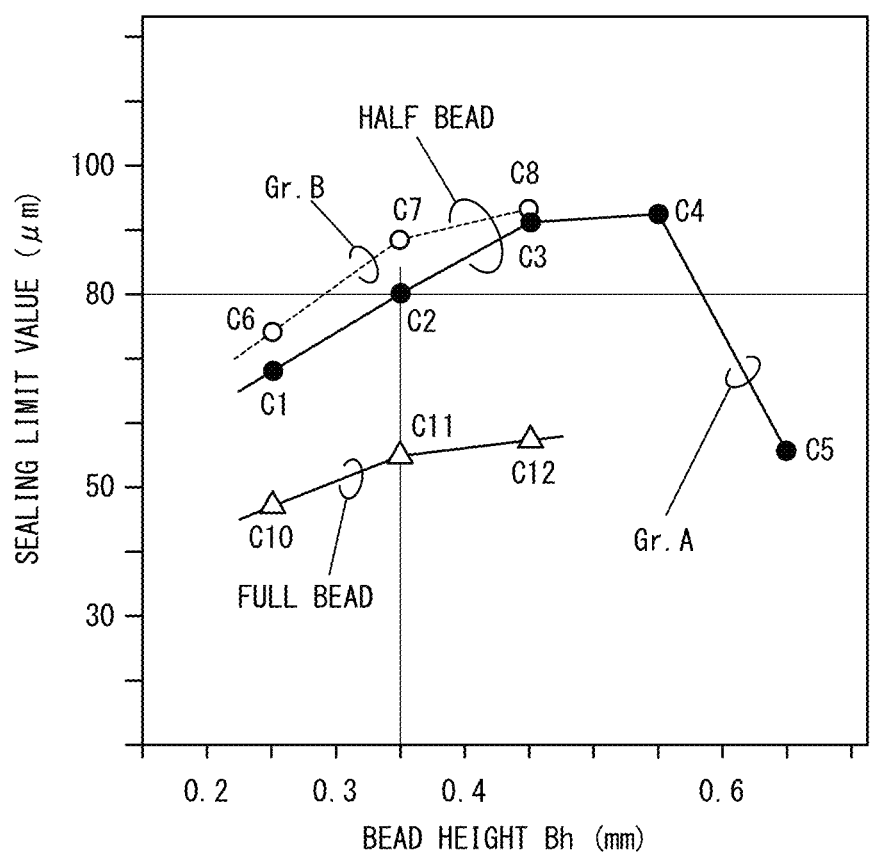
FIG. 11 is a graph of the test results listed in Table 1.

The test results are listed in Table 1. FIG. 11 is a graph illustrating the test results. In Table 1, "good" denotes that there were no cracks or streak marks, and "poor" denotes that there were cracks or streak marks.

Figure 12A:
FIG. 12A is a sectional view illustrating the state of "fine cracks" at the surface of a sealant in a half bead.
Figure 12B:
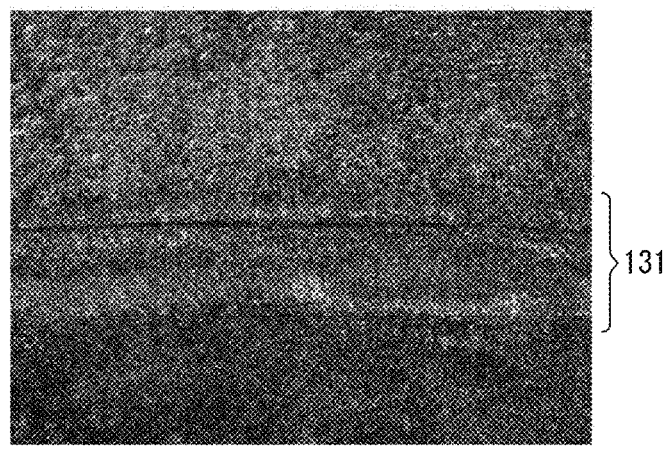
FIG. 12B is a sectional view illustrating the state of "streak marks" at the surface of the sealant in the half bead.
Figure 12C:
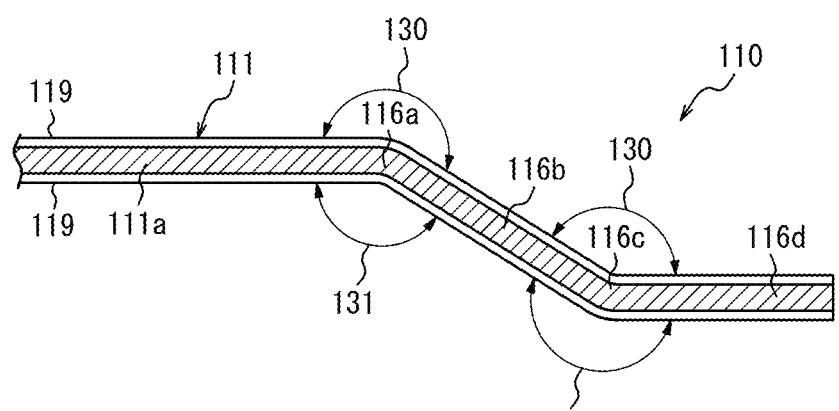
FIG. 12C is a view illustrating the occurrence ranges of "fine cracks" and "streak marks"

FIG. 12B is a sectional view illustrating the state of "streak marks" at the surface of the sealant in the half bead. Reference sign 131 indicates the part in which "streak marks" occurred. As illustrated in FIG. 12C, "streak marks" occurred in the range centering at the internal angle side of each of the first bend portion 116a and the second bend portion 116c of the half bead 116.

TABLE 1

| Comparative Example C | Gr | Bead radius Br (mm) | Laminate structure | Substrate thickness t (mm) | Bead height Bh (mm) | Sealing limit value (μm) | Cracks | Streak marks |
|---|---|---|---|---|---|---|---|---|
| 1 | Gr. A | 0.5 | Half bead | 0.20 | 0.25 | 68 | Good | Good |
| 2 | | | | | 0.35 | 80 | Good | Good |
| 3 | | | | | 0.45 | 91 | Good | Poor |
| 4 | | | | | 0.55 | 92 | Poor | Poor |
| 5 | | | | | 0.65 | 55 | Poor | Poor |
| 6 | Gr. B | | | 0.25 | 0.25 | 74 | Good | Good |
| 7 | | | | | 0.35 | 88 | Good | Poor |
| 8 | | | | | 0.45 | 93 | Good | Poor |
| 9 | | | | | 0.55 | 93 | Poor | Poor |
| 10 | Gr. C | | Full bead | 0.20 | 0.25 | 47 | Good | Good |
| 11 | | | | | 0.35 | 55 | Poor | Poor |
| 12 | | | | | 0.45 | 57 | Poor | Poor |

Comparative Example samples C1 and C2 of Gr. A are samples whose substrate thickness t is 0.20 mm and whose bead height Bh of the half bead 116 is 0.25 mm and 0.35 mm respectively, which are currently used commonly. The common use of Comparative Example samples C1 and C2 is based on the supposition that, if the bead height Bh of the half bead 116 is set to be higher like Comparative Example samples C3 to C5, "fine cracks" tend to occur at the surface of the sealant 119 in the part (bend portion) of each of the intersection points P1 and P2 of the half bead 116. As can be seen from the test results, there were no cracks at the surface of the sealant 119 and the surface of the sealant 119 was unchanged in the half bead 116 in Comparative Example samples C1 and C2 and Comparative Example sample C3 in the common use range, but "fine cracks" were found at the surface of the sealant 119 in the half bead 116 in Comparative Example samples C4 and C5 in which the bead height Bh was increased outside the common use range. In particular, Comparative Example sample C5 with a bead height Bh of 0.65 mm obviously had "fine cracks", and the sealing limit value was lower than that of Comparative Example sample C2. This is presumed to be caused by fine cracks at the surface of the sealant 119 applied to the surface of the metal substrate 111. Meanwhile, the test results also demonstrate that the sealing limit value of the half bead 116 can be increased by increasing the bead height Bh of the half bead 116.

FIG. 12A is a sectional view illustrating the state of "fine cracks" at the surface of the sealant in the half bead. Reference sign 130 indicates the part in which "fine cracks" occurred. As illustrated in FIG. 12C, "fine cracks" occurred in the range centering at the external angle side of each of the first bend portion 116a and the second bend portion 116c of the half bead 116.

While no "streak marks" were found at the surface of the sealant 119 in the half bead 116 in Comparative Example samples C1 and C2, "streak marks" were found at the surface of the sealant 119 in the half bead 116 in Comparative Example samples C3 to C5.

Thus, in Gr. A, only Comparative Example samples C1 and C2 had neither "fine cracks" nor "streak marks" at the surface of the sealant 119 in the half bead 116. Hence, the sealing limit value of the half bead 116 in Gr. A was determined as "80 μm" of Comparative Example sample C2.

Comparative Example samples C6 to C9 of Gr. B have a substrate thickness t of the metal substrate 111 increased to 0.25 mm from 0.20 mm in Gr. A. The sealing limit value of Comparative Example samples C6 to C9 in Gr. B was improved by about 5 μm as compared with those of 0.20 mm in Gr. A. However, it was found out that an increase in the substrate thickness t is unlikely to significantly improve the sealing limit value. This is presumed to be because, with an increase in the substrate thickness t, the rigidity of the half bead 116 increased and a higher compression load was required, as a result of which the compressibility of the half bead 116 decreased and its restorability could not be used sufficiently. Moreover, "fine cracks" occurred in Comparative Example sample C9, and "streak marks" were found in Comparative Example samples C7 to C9. Thus, in Gr. B, only Comparative Example sample C6 had neither "fine cracks" nor "streak marks" at the surface of the sealant 119 in the half bead 116. Hence, the sealing limit value of the half bead 116 in Gr. B was determined as "74 μm" of Comparative Example sample C6. In Gr. B, too, the sealing limit value of the half bead 116 was higher when the bead height Bh of the half bead 116 was higher.

Comparative Example samples C10 to C12 of Gr. C have the full bead 113 instead of the half bead 116. However, their sealing limit values were lower than those of the commonly used Comparative Example samples C1 and C2, and there was no sealing limit value increasing effect. This is presumed to be because, as the full bead 113 structurally has a high compression load, the compressibility of the full bead 113 decreased with an increase in the compression load, and its restorability could not be used sufficiently. Moreover, "fine cracks" and "streak marks" were found in Comparative Example samples C11 and C12. Thus, in Gr. C, only Comparative Example sample C10 had neither "fine cracks" nor "streak marks" at the surface of the sealant 119 in the half bead 116. Hence, the sealing limit value in Gr. C was determined as "47 μm" of Comparative Example sample C10. In Gr. C, too, the sealing limit value of the half bead 116 was higher when the bead height Bh of the half bead 116 was higher.

Based on these evaluation results, the target of the sealing limit value of the half bead 116 without causing "fine cracks" and "streak marks" on the sealant 119 was set to greater than or equal to 80 μm of commonly used Comparative Example sample C2, in improvement of the half bead.

Figure 13:
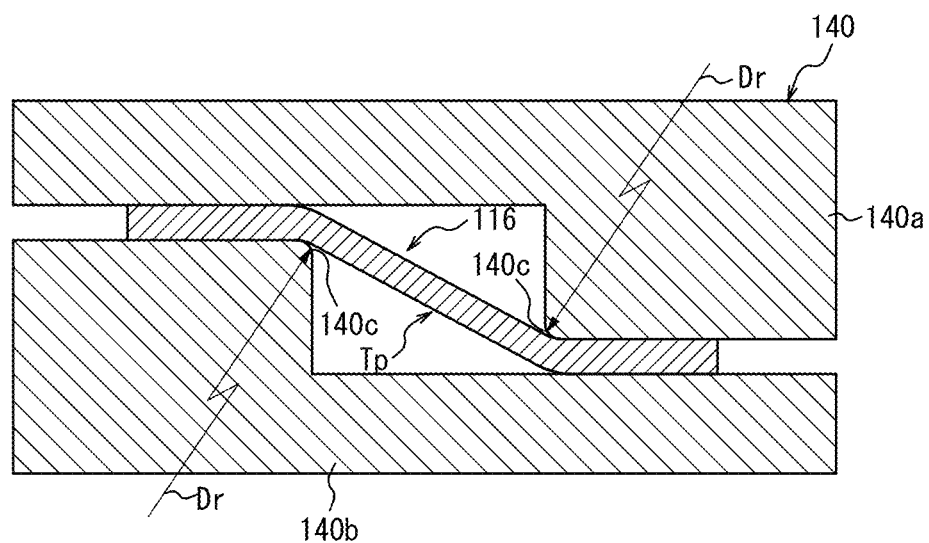
FIG. 13 is a schematic view illustrating press working of the test piece using a conventional half bead mold composed of an upper mold and a lower mold.

FIG. 13 is a schematic view illustrating press working of a test piece using a conventional half bead mold composed of an upper mold and a lower mold. To solve the problem of "fine cracks" and "streak marks" on the sealant 119, we examined a "half bead mold" used to form the half bead 116 in the conventional metal gasket 110.

It can be understood from the foregoing evaluation results that the "fine cracks" of the sealant 119 occurred in the part of each of the intersection points P1 and P2 in FIG. 9A, i.e. in the range centering at the external angle side (convex surface) of each of the first bend portion 116a and the second bend portion 116c of the half bead 116. The cause of this phenomenon is presumed to be as follows: As a result of increasing the bead height Bh as in Comparative Example samples C4 and C5, the surface of each of the first bend portion 116a and the second bend portion 116c on the external angle side was greatly stretched in a direction in which it spreads with the sealant 119, and as a result part of the surface of the sealant 119 was broken and developed "fine cracks".

It can be understood from the foregoing evaluation results that the "streak marks" of the sealant 119 occurred in the part of each of the intersection points P1 and P2 in FIG. 9A, i.e. in the range centering at the internal angle side (concave surface) of each of the first bend portion 116a and the second bend portion 116c of the half bead 116. The cause of this phenomenon is presumed to be as follows: As a result of increasing the bead height Bh as in Comparative Example samples C3 to C5, the surface of each of the first bend portion 116a and the second bend portion 116c on the internal angle side was contracted together with the sealant 119, and as a result part of the surface of the sealant 119 bit into the first bend portion 116a or the second bend portion 116c in one streak to leave marks. Such marks are presumed to result from the chamfer 140c of each of the upper mold 140a and the lower mold 140b coming into contact with the sealant 119, and are believed to be caused by increasing the bead height Bh, as with the above-described fine cracks. That is, as a result of increasing the bead height Bh to be more than the typical height, the first bend portion 116a and the second bend portion 116c are bent more firmly by the chamfer 140c on the internal angle side. In addition, the spring stress of the metal substrate is also exerted, so that the chamfer 140c of the half bead mold 140 firmly bites into the sealant 119 of about 25 μm in film thickness and develops the marks.

The foregoing "fine cracks" occur at the convex surface which is the surface on the outer angle side of each of the first bend portion 116a and the second bend portion 116c, i.e. the intersection points P1 and P2, of the half bead 116. Since this convex surface is an important part that forms the sealing line of the half bead 116 and directly affects the performance of the sealing limit value, "fine cracks" need to be resolved.

The foregoing "streak marks" occur at the concave surface which is the surface on the inner angle side of each of the first bend portion 116a and the second bend portion 116c, i.e. the intersection points P1 and P2, of the half bead 116. The chamfer 140c of the half bead mold 140 firmly bites into the concave surface and causes the sealant 119 to peel off the surface of the metal substrate 111, which affects the sealing performance in the long term. Therefore, "streak marks" need to be resolved, too.

Accordingly, given that the R value, i.e. the radius Dr, of the chamfer 140c of the conventional half bead mold 140 is about 0.3 mm to 0.5 mm corresponding to a production technological range in mold production, we measured the shape of the half bead 116 of Comparative Example samples C1 to C5 and the like formed using the conventional half bead mold 140, and studied the bead radius Br of the part formed by the chamfer 140c. FIG. 9B is a principal part enlarged view of the line of plotting in FIG. 9A. The bead radius Br of the part corresponding to the chamfer 140c of the half bead mold 140 measured in FIG. 9B was a small value of about 0.3 mm to 0.5 mm approximately equal to the value of the radius Dr of the chamfer 140c of the half bead mold 140.

In Comparative Example samples C1 and C2 commonly used as the half bead 116 of the conventional metal gasket 110, the bead height Bh was low. Accordingly, even when the R value of the chamfer 140c of the half bead mold 140 was small, its influence was insignificant, and therefore "fine cracks" did not occur. Moreover, even when the R value of the chamfer 140c was small, the influence of the spring stress of the metal substrate was insignificant because of the low bead height Bh, and therefore "streak marks" did not occur.

Since the occurrence of "fine cracks" and "streak marks" is likely to be caused when the R value of the chamfer 140c of the half bead mold 140 is small, it can be considered that both problems can be resolved by increasing the R value of the chamfer 140c in the production of the half bead mold 140. Moreover, the evaluation results in Table 1 based on the Comparative Example samples of the half bead 116 of the conventional metal gasket 110 demonstrate that, even when the bead width Bw is fixed to 1.5 mm, a higher sealing limit value can be obtained by changing the bead height Bh to be higher. If increasing the R value of the chamfer 140c of the half bead mold 140 can resolve both problems of "fine cracks" and "streak marks" at the surface of the sealant 119, the "sealing limit value" of the half bead 116 is expected to increase. In particular, to achieve a bead height Bh of 0.65 mm as in Comparative Example sample C5 in which the sealing limit value decreased, the R value of the chamfer 140c of the conventional half bead mold 140 is insufficient, and a new half bead mold needs to be produced with the R value of the chamfer 140c being intentionally set to a large value in the mold design stage.

Figure 14:
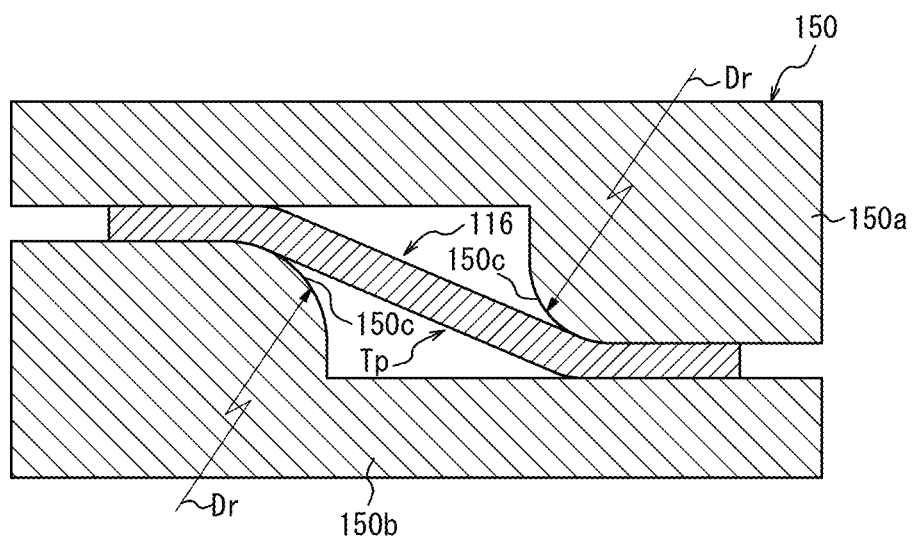
FIG. 14 is a schematic view illustrating press working of the test piece using an improved half bead mold.

We accordingly produced a half bead mold 150 illustrated in FIG. 14 whose chamfer 150c has an R value (radius Dr) larger than the conventional half bead mold, and produced Example samples J1 to J49 by forming the half bead 116 using the same test piece Tp as above while changing the R value of the chamfer 150c provided in each of an upper mold 150a and a lower mold 150b of the improved half bead mold 150. We then measured the shape of each of Example samples J1 to J49 using a shape measuring instrument and performed plotting, and determined, from the plotting result, the optimum numerical range of the R value of the bead radius Br forming the intersection points P1 and P2 that constitute the sealing line of the half bead shape.

<Evaluation Test 1>

The optimum range of the R value of the bead radius Br was determined by evaluation test 1 for evaluating Example samples J1 to J7. Example samples J1 to J7 had a bead width Bw fixed to 1.50 mm, a bead height Bh fixed to 0.45 mm, and a bead radius Br changed from 1.5 mm to 4.5 mm by 0.5 mm. Example samples J1 to J7 were each composed of one metal substrate with a substrate thickness t of 0.20 mm, both surfaces of which were coated with a sealant mainly made of NBR and having a thickness of 25 μm.

To maintain the conditions of a bead width Bw of 1.50 mm and a bead height Bh of 0.45 mm in the press working of the test piece Tp using the half bead mold 150 even when changing the radius Dr of the chamfer 150c of the upper mold 150a and the lower mold 150b of the half bead mold 150 so as to correspond to the bead radius Br of each of Example samples J1 to J7, the conditions were adjusted as appropriate by an adjustment mechanism provided in the half bead mold 150 when producing Example samples J1 to J7.

Figure 15:
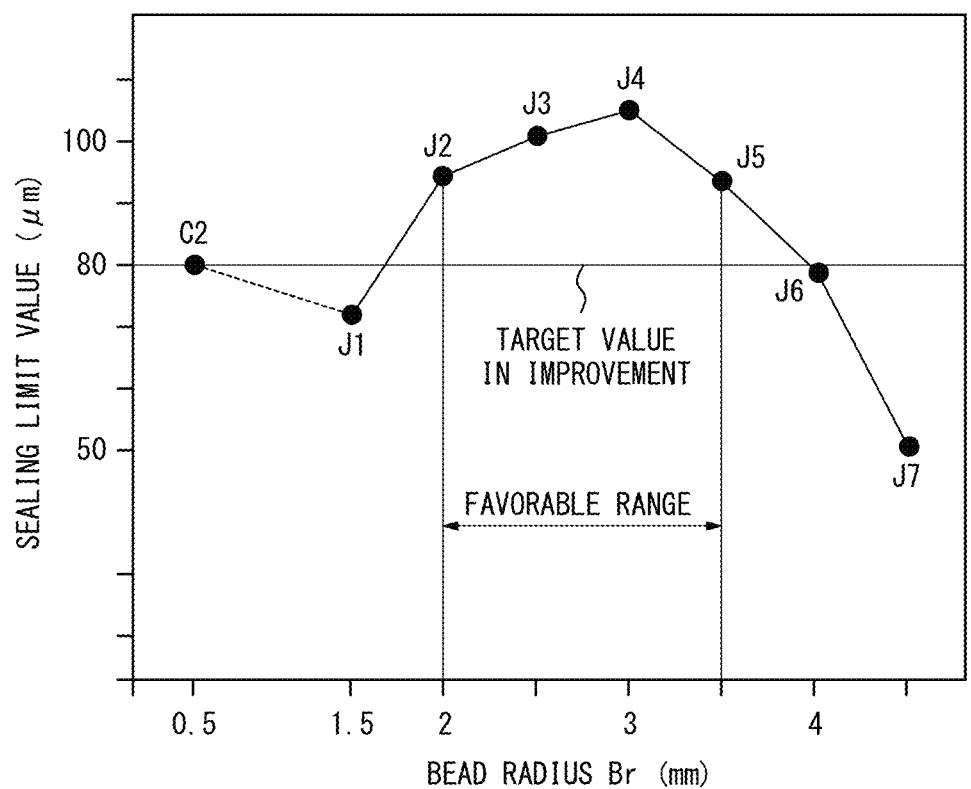
FIG. 15 is a graph of the test results listed in Table 2.

For Example samples J1 to J7, a test reproducing the head lift phenomenon (mouth opening phenomenon) was conducted using the same sealing limit tester as above, and the sealing limit value was measured and whether cracks and streak marks occurred was evaluated. The test results of evaluation test 1 are listed in Table 2. FIG. 15 is a graph illustrating the test results. In Table 2, "good" denotes that there were no cracks or streak marks and that the sealing limit value was not less than the target, and "poor" denotes that there were cracks or streak marks and that the sealing limit value was less than the target. Table 2 also includes Comparative Example sample C2 in Table 1, for comparison of the sealing limit value with Example samples J1 to J7. Comparative Example sample C2 is a Comparative Example sample with a target value of "80 μm" set as a sealing limit value in improving at least the half bead shape.

Br forming the intersection points P1 and P2 of the half bead 116 was 2.0 mm to 3.5 mm. The sealing limit value of Example sample J1 was not very different from the sealing limit value of conventional Comparative Example sample C2. This indicates that the sealing limit value improving effect is insignificant when the bead radius Br is 1.5 mm. Moreover, the sealing limit value tends to decrease if the bead radius Br is excessively large, as in Example samples J6 and J7.

These test results demonstrate that the effective range of the bead radius Br forming each of the radius at the convex surface of the first bend portion 116a and the radius at the concave surface of the second bend portion 116c, i.e. intersection points P1 and P2, of the half bead 116 is 2.0 mm to 3.5 mm.

<Evaluation Test 2>

In evaluation test 2, the sealing limit value was evaluated from the relationship between the bead width Bw and the bead height Bh. This evaluation was performed using Example samples J8 to J27.

In Example samples J8 to J27, the bead radius Br was set to 3 mm which is approximately at the center in the range of 2.0 mm to 3.5 mm as the optimum range of the bead radius Br determined in evaluation test 1, and the bead width Bw and the bead height Bh were changed. The bead width Bw was changed in a range of 1.5 mm to 2.0 mm, and the bead height Bh was changed in a range of 0.25 mm to 0.95 mm. The same adjustment mechanism of the half bead mold 150 as above was employed to enable the bead width Bw to be maintained at a fixed value even when changing the bead height Bh, and enable the bead height Bh to be maintained at a fixed value even when changing the bead width Bw.

TABLE 2

| Example J | Bead width Bw (mm) | Bead height Bh (mm) | Bead radius Br (mm) | Sealing limit value (μm) | Cracks | Streak marks | Limit value target |
|---|---|---|---|---|---|---|---|
| Comparative Example C2 | 1.5 | 0.35 | 0.5 | 80 | Good | Good | 80 |
| 1 | 1.5 | 0.45 | 1.5 | 72 | Good | Good | Poor |
| 2 | | | 2.0 | 94 | Good | Good | Good |
| 3 | | | 2.5 | 100 | Good | Good | Good |
| 4 | | | 3.0 | 104 | Good | Good | Good |
| 5 | | | 3.5 | 93 | Good | Good | Good |
| 6 | | | 4.0 | 78 | Good | Good | Poor |
| 7 | | | 4.5 | 50 | Good | Good | Poor |

As is clear from Table 2, in all of Example samples J1 to J7, neither "fine cracks" nor "streak marks" were found at the surface of the sealant. The results demonstrate that the use of the improved half bead mold 150 having an increased R value of the chamfer 150c has an effect of preventing damage to the surface of the sealant 119 in the half bead 116, and the surface of the sealant 119 is unlikely to be affected at least if the bead radius Br of the half bead 116 is set to 1.5 mm or more.

Figure 16:
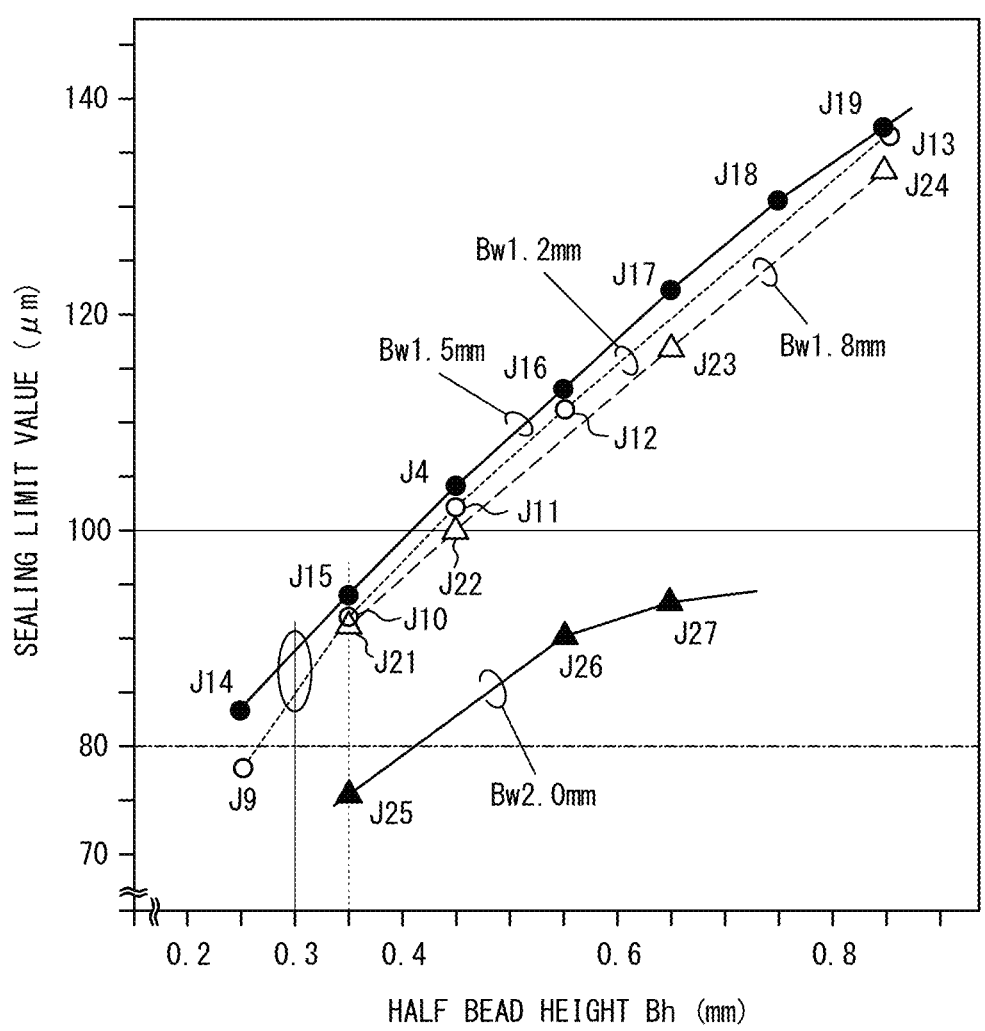
FIG. 16 is a graph of the test results listed in Table 3.

While the sealing limit value of Comparative Example sample C2 by the conventional half bead mold 140 was 80 μm, Example samples J2 to J5 exceeded this target value in the present sealing limit value test, as can be seen from Table 2 and FIG. 15. In Example samples J2 to J5, the bead radius For Example samples J8 to J27, a test reproducing the head lift phenomenon (mouth opening phenomenon) was conducted using the same sealing limit tester as above, and the sealing limit value was measured and whether cracks and streak marks occurred was evaluated. The test results of evaluation test 2 are listed in Table 3. FIG. 16 is a graph illustrating the test results. In Table 3, "good" denotes that there were no cracks or streak marks and that the sealing limit value was not less than the target, and "poor" denotes that there were cracks or streak marks and that the sealing limit value was less than the target. Table 3 also includes Comparative Example sample C2 in Table 1 for comparison of the sealing limit value with Example samples J8 to J27, as in Table 2.

TABLE 3

| Example J | Bead radius Br (mm) | Bead width Bw (mm) | Bead height Bh (mm) | Sealing limit value (μm) | Cracks | Streak marks | Limit value target |
|---|---|---|---|---|---|---|---|
| Comparative Example C2 | 0.5 | 1.5 | 0.35 | 80 | Good | Good | 80 |
| 8 | 3.0 | 1.0 | 0.45 | — | — | — | Poor |
| 9 | | 1.2 | 0.25 | 78 | Good | Good | Poor |
| 10 | | | 0.35 | 92 | Good | Good | Good |
| 11 | | | 0.45 | 102 | Good | Good | Good |
| 12 | | | 0.55 | 111 | Good | Good | Good |
| 13 | | | 0.85 | 137 | Good | Good | Good |
| 14 | | 1.5 | 0.25 | 83 | Good | Good | Good |
| 15 | | | 0.35 | 94 | Good | Good | Good |
| 4 | | | 0.45 | 104 | Good | Good | Good |
| 16 | | | 0.55 | 113 | Good | Good | Good |
| 17 | | | 0.65 | 122 | Good | Good | Good |
| 18 | | | 0.75 | 130 | Good | Good | Good |
| 19 | | | 0.85 | 137 | Good | Good | Good |
| 20 | | | 0.95 | 145 | Poor | Good | Good |
| 21 | | 1.8 | 0.35 | 91 | Good | Good | Good |
| 22 | | | 0.45 | 100 | Good | Good | Good |
| 23 | | | 0.65 | 117 | Good | Good | Good |
| 24 | | | 0.85 | 132 | Good | Good | Good |
| 25 | | 2.0 | 0.35 | 76 | Good | Good | Poor |
| 26 | | | 0.55 | 90 | Good | Good | Good |
| 27 | | | 0.65 | 93 | Good | Good | Good |

Example sample J8 with a bead width Bw of 1.0 in Table 3 was unable to be produced. This is because a bead radius Br of 3.0 mm was too large to form the half bead 116 with a bead width Bw of 1.0 mm.

As can be seen from Table 3, the surface of the sealant 119 was affected only in Example sample J20. Example sample J20 had a bead width Bw of 1.5 mm and a bead height Bh of 0.95 mm, and, although its sealing limit value was more than the target value of 80 μm, "fine cracks" were found at the surface of the sealant 119. Meanwhile, no "streak marks" were found at the surface of the sealant 119 in Example sample J20.

Examining the sealing limit value with respect to the case of a bead width Bw of 1.5 mm in FIG. 16 which is a graph of the test results in Table 3 revealed the following: In the case where the bead width Bw was 1.2 mm, the sealing limit value decreased slightly as compared with the case where the bead width Bw was 1.5 mm, but was approximately similar to in the case where the bead width Bw was 1.5 mm. Likewise, in the case where the bead width Bw was 1.8 mm, the sealing limit value decreased slightly as compared with the case where the bead width Bw was 1.5 mm, but was approximately similar to in the case where the bead width Bw was 1.5 mm. In the case where the bead width Bw was 2.0 mm, the sealing limit value decreased significantly as compared with the case where the bead width Bw was 1.5 mm, indicating that a bead width Bw of 2.0 mm is not very suitable as a half bead shape required by the presently disclosed techniques. In.

Example sample J20, the sealing limit value was more than the target value of 80 μm, but "fine cracks" were found at the surface of the sealant 119, as mentioned above. Besides, Example sample J20 after molding was greatly distorted due to warping of its entire shape. From these results, 0.85 mm of Example sample J19 was determined as the upper critical point of the bead height Bh in the improvement.

In Example sample J9 (bead width Bw: 1.2 mm, bead height Bh: 0.25 mm, sealing limit value: 78 μm) and Example sample J25 (bead width Bw: 2.0 mm, bead height Bh: 0.35 mm, sealing limit value: 76 μm), the sealing limit value was less than the target value of 80 μm. Regarding the other Example samples J, all three types, namely, Example samples J10 to J13 with a bead width Bw of 1.2 mm, Example samples J14 to J19 with a bead width Bw of 1.5 mm, and Example samples J21 to J24 with a bead width Bw of 1.8 mm, had a favorable sealing limit value of more than the target value of 80 μm, i.e. the value of conventional Comparative Example sample C2. These Example samples J also produced favorable results with regard to the problems of the sealant surface, as neither "fine cracks" nor "streak marks" were found at the surface of the sealant 119. In particular, while the bead height Bh of Comparative Example sample C2 when the sealing limit value was 80 μm was 0.35 mm, in all three types of Example samples J of a bead width Bw of 1.2 mm, 1.5 mm, and 1.8 mm, the sealing limit value at the same bead height of 0.35 mm as Comparative Example sample C2 was 90 μm or more, and thus a favorable sealing limit value improving effect was recognized.

This demonstrates that improving the R value of the bead radius Br to be larger than the conventional R value of 0.5 mm not only resolves "fine cracks" and "streak marks" at the surface of the sealant 119 but also significantly contributes to an improved sealing limit value.

From the test results of evaluation test 2 in Table 3 and FIG. 16, the following determination was made: When the bead radius Br is a fixed value (R 3.0 mm), increasing the bead height Bh while the bead width Bw is fixed improves the sealing limit value. Further, since the sealing limit value is stable without significant variation even when the bead width Bw is changed to be 1.2 mm, 1.5 mm, and 1.8 mm, the sealing limit value can be sufficiently improved if the bead width Bw is in a range of 1.2 mm to 1.8 mm and the bead height Bh is in a range of 0.35 mm to 0.85 mm.

<Evaluation Test 3>

In evaluation test 3, the relationship between the R value of the bead radius Br and the sealing limit value was evaluated. This evaluation was performed using Example samples J28 to J49.

In terms of resolving the problems of "fine cracks" and "streak marks" at the surface of the sealant 119 and improving the sealing limit value, we learned from evaluation test 1 that the measure is effective if the R value of the bead radius Br is in a range of 2.0 mm to 3.5 mm, and learned from evaluation test 2 that the measure is effective if the bead width Bw is in a range of 1.2 mm to 1.8 mm and the bead height Bh is in a range of 0.35 mm to 0.85 mm. In evaluation test 2, the bead height Bh and the bead width Bw were changed while setting the bead radius Br to 3.0 mm. Accordingly, in evaluation test 3, whether the same results as in evaluation test 2 can be obtained in the case where the R value of the bead radius Br is 2.0 mm and in the case where the R value of the bead radius Br is 3.5 mm was determined. Regarding the bead radius Br of 2.5 mm, it was not subjected to the determination on the ground that it is an intermediate value between 2.0 mm and 3.0 mm in bead radius Br and therefore an intermediate line between 2.0 mm and 3.0 mm in bead radius Br can be used as a substitute. Moreover, based on the results of evaluation test 2, Example sample J20 with a bead width Bw of 1.5 mm and a bead height Bh of 0.95 mm was omitted from the test.

Example samples J28 to J38 were produced using the half bead mold 150 capable of adjusting each dimension so as to have an R value of the bead radius Br of 2.0 mm and have a bead width Bw of 1.2 mm and a bead height Bh of 0.35 mm, 0.45 mm, and 0.85 mm, a bead width Bw of 1.5 mm and a bead height Bh of 0.35 mm, 0.45 mm, 0.55 mm, 0.65 mm, 0.75 mm, and 0.85 mm, and a bead width Bw of 1.8 mm and a bead height Bh of 0.35 mm, 0.45 mm, and 0.85 mm.

Likewise, Example samples J39 to J49 were produced using the half bead mold 150 capable of adjusting each dimension so as to have an R value of the bead radius Br of 3.5 mm and have a bead width Bw of 1.2 mm and a bead height Bh of 0.35 mm, 0.45 mm, and 0.85 mm, a bead width Bw of 1.5 mm and a bead height Bh of 0.35 mm, 0.45 mm, 0.55 mm, 0.65 mm, 0.75 mm, and 0.85 mm, and a bead width Bw of 1.8 mm and a bead height Bh of 0.35 mm, 0.45 mm, and 0.85 mm.

For Example samples J39 to J49, a test reproducing the head lift phenomenon (mouth opening phenomenon) was conducted using the same sealing limit tester as above, and the sealing limit value was measured and whether cracks and streak marks occurred was evaluated. The test results of evaluation test 3 for Example samples J28 to J38 are listed in Table 4. The test results of evaluation test 3 for Example samples J39 to J49 are listed in Table 5. In Tables 4 and 5, "good" denotes that there were no cracks or streak marks and that the sealing limit value was not less than the target, and "poor" denotes that there were cracks or streak marks and that the sealing limit value was less than the target. Tables 4 and 5 also include Comparative Example sample C2 in Table 1 for comparison of the sealing limit value with Example samples J28 to J49, as in Table 2.

TABLE 4

| Example J | Bead radius Br (mm) | Bead width Bw (mm) | Bead height Bh (mm) | Sealing limit value (μm) | Cracks | Streak marks | Limit value target |
|---|---|---|---|---|---|---|---|
| Comparative Example C2 | 0.5 | 1.5 | 0.35 | 80 | Good | Good | 80 |
| 28 | 2.0 | 1.2 | 0.35 | 87 | Good | Good | Good |
| 29 | | | 0.45 | 95 | | | |
| 30 | | | 0.85 | 126 | | | |
| 31 | | 1.5 | 0.35 | 88 | Good | Good | Good |
| 2 | | | 0.45 | 94 | | | |
| 32 | | | 0.55 | 104 | | | |
| 33 | | | 0.65 | 110 | | | |
| 34 | | | 0.75 | 118 | | | |
| 35 | | | 0.85 | 127 | | | |
| 36 | | 1.8 | 0.35 | 86 | Good | Good | Good |
| 37 | | | 0.45 | 93 | | | |
| 38 | | | 0.85 | 125 | | | |

TABLE 5

| Example J | Bead radius Br (mm) | Bead width Bw (mm) | Bead height Bh (mm) | Sealing limit value (μm) | Cracks | Streak marks | Limit value target |
|---|---|---|---|---|---|---|---|
| Comparative Example C2 | 0.5 | 1.5 | 0.35 | 80 | Good | Good | 80 |
| 39 | 3.5 | 1.2 | 0.35 | 86 | Good | Good | Good |
| 40 | | | 0.45 | 93 | | | |
| 41 | | | 0.85 | 125 | | | |
| 42 | | 1.5 | 0.35 | 88 | Good | Good | Good |
| 5 | | | 0.45 | 93 | | | |
| 43 | | | 0.55 | 103 | | | |
| 44 | | | 0.65 | 111 | | | |
| 45 | | | 0.75 | 116 | | | |
| 46 | | | 0.85 | 127 | | | |
| 47 | | 1.8 | 0.35 | 86 | Good | Good | Good |
| 48 | | | 0.45 | 94 | | | |
| 49 | | | 0.85 | 126 | | | |

In all of Example samples J28 to J49 subjected to evaluation test 3, i.e. all combinations of a bead radius Br of 2.0 mm and 3.5 mm, a bead width Bw of 1.2 mm to 1.8 mm, and a bead height Bh of 0.35 mm to 0.85 mm, neither "fine cracks" nor "streak marks" were found at the surface of the sealant 119. In all combinations of a bead radius Br of 2.0 mm and 3.5 mm, a bead width Bw of 1.2 mm to 1.8 mm, and a bead height Bh of 0.35 mm to 0.85 mm, the sealing limit value was more than the target value of 80 μm.

The results of evaluation test 3 revealed that the sealing effect of the gasket according to the present disclosure is in a satisfactory range if the bead width Bw is in a range of 1.2 mm to 1.8 mm, the bead height Bh is in a range of 0.35 mm to 0.85 mm, and the bead radius Br is in a range of 2.0 mm to 3.5 mm. That is, the test results of Comparative Example samples C1 to C7 and Example samples J1 to J49 revealed that the half bead 16 of the metal gasket 10, as a result of having a bead width Bw in a range of 1.2 mm to 1.8 mm, a bead height Bh in a range of 0.35 mm to 0.85 mm, and a bead radius Br in a range of 2.0 mm to 3.5 mm, can exceed a "sealing limit value of 80 μm" with no "fine cracks" and "streak marks" at the surface of the sealant 19 as required by the present disclosure.

We further conducted validation tests on the bead restoration amount, whether bead cracks occur, and whether peeling at the surface of the sealant occurs for the metal gasket 10 in FIG. 1, to determine whether the half bead 16 of the metal gasket 10 has stable sealing performance in the long term while satisfying weight reduction required in terms of engine design, heat conductivity improvement, compression ratio adjustment, cost reduction, and the like.

<Validation Test 1>

We first conducted a validation test for the restoration amount (remaining bead amount) of the half bead 116 using the test piece Tp, to determine the improving effect for a "decrease in sealing performance due to a decrease in bead restoration force". As a method of determining the bead restoration force, the measurement of the "remaining bead amount" was performed. The "remaining bead amount" herein is the bead height Bh measured by the same method as in FIGS. 3A and 3B after removing Example sample J used in the foregoing "sealing limit value measurement" from the tester. When the change of the remaining bead amount Bh from the initial bead height Bh is smaller, a greater bead restoration force remains. Thus, the improving effect of the half bead can be determined by comparing the remaining bead amount between each Example sample J and conventional Comparative Example sample C.

Figure 17:
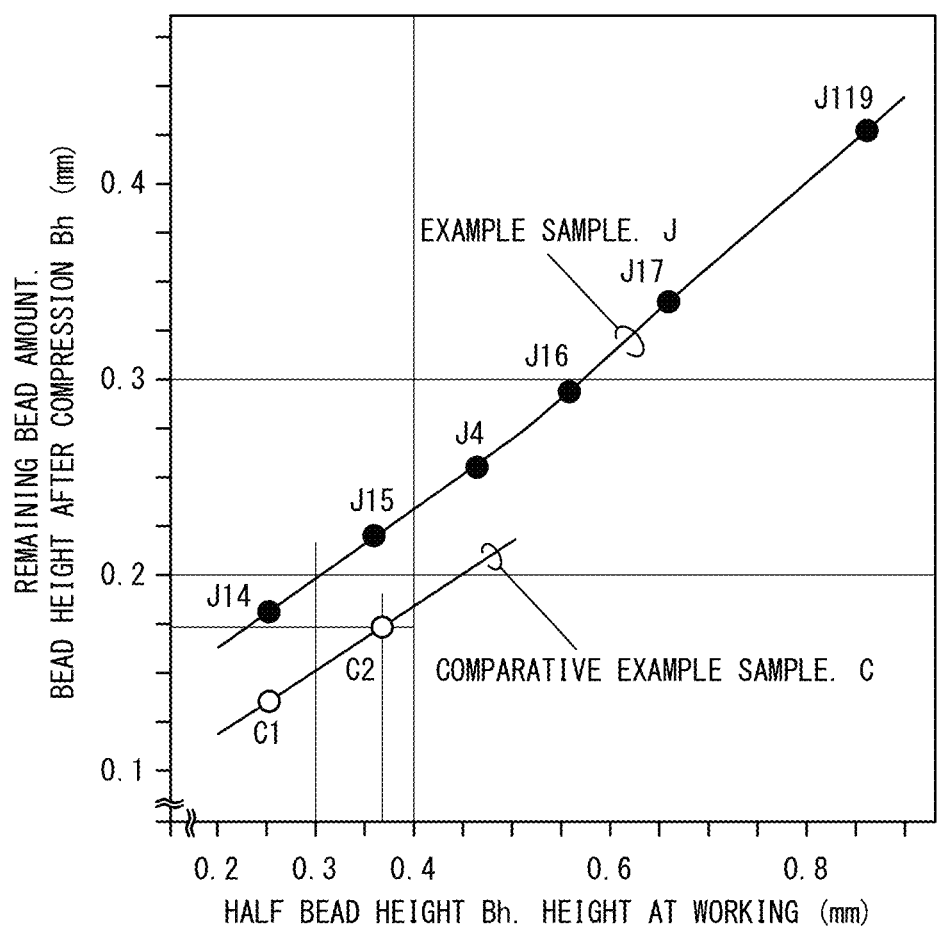
FIG. 17 is a graph of the test results listed in Table 6.

The remaining bead amount was measured as follows: Using the same sealing limit tester as above and without using heating and oil load, the half bead 116 was compressed for 10 sec under a prescribed pressing load (1200 kg: same as in the sealing limit value test) by the universal tester, and then the pressing load of the universal tester was decreased to 0 to release the half bead 116. The half bead 116 was then again compressed to the foregoing load and released. After repeatedly performing this cycle of compression and release 100 times, the half bead 116 was removed from the jigs and the remaining bead amount Bh was measured. In this test, Example samples J4, J14, J15, J16, J17, and J19 having a bead width Bw of 1.5 mm and a bead radius Br of 3.0 mm and different in bead height Bh from each other were used. For comparison, Comparative Example sample C2 having a bead width Bw of 1.5 mm, a bead radius Br of 0.5 mm, and a bead height Bh of 0.35 mm was used. The test results of validation test 1 are listed in Table 6 and illustrated in FIG. 17.

TABLE 6

| Example J | Bead width Bw (mm) | Bead radius Br (mm) | Bead height Bh Nominal | Initial height Bh measured value (mm) | Remaining bead amount Bh (mm) | Change amount % |
|---|---|---|---|---|---|---|
| Comparative Example C2 | 1.5 | 0.5 | 0.35 | 0.365 | 0.171 | 53.2 |
| S14 | 1.5 | 3.0 | 0.25 | 0.253 | 0.180 | 28.9 |
| S15 | | | 0.35 | 0.353 | 0.221 | 37.4 |
| S4 | | | 0.45 | 0.458 | 0.255 | 44.3 |
| S16 | | | 0.55 | 0.555 | 0.293 | 47.2 |
| S17 | | | 0.65 | 0.654 | 0.338 | 48.3 |
| S19 | | | 0.85 | 0.857 | 0.425 | 50.4 |

In each Example sample J with a half bead 116 having a bead radius Br in a range of 2.0 mm to 3.5 mm, the effect was significant, and the change rate from the initial height before setting in the universal tester to the remaining bead amount after the test was lower than that of conventional Comparative Example sample C2, indicating that the degree of settling of the half bead 116 was low. With an increase in bead height Bh, the change amount of the half bead 116 decreased and the absolute value of the remaining bead amount increased. From the problems at the surface of the sealant 119, it can be understood that the half bead 116 of Example sample J was reliably improved given that the critical point of the bead height Bh of conventional Comparative Example sample C2 was 0.35 mm.

Comparative Example sample C2 (bead height Bh: 0.35 mm) and Example sample J19 (bead height Bh: 0.85 mm) had the same level of change amount, i.e. about 50%. Meanwhile, the absolute value of the remaining bead amount was greatly different, as Example sample J19 had a remaining bead amount Bh of 0.425 mm whereas Comparative Example sample C2 had a remaining bead amount Bh of 0.171 mm. This also demonstrates that the sealing limit value can be maintained and improved and the settling of the half bead 116 can be prevented effectively by setting the bead radius Br in a range of 2.0 mm to 3.5 mm.

<Validation Test 2>

Next, we performed a fatigue strength test as validation test 2 for bead cracks which occur in the half bead, to determine a "decrease in sealing function due to occurrence of bead cracks". Bead cracks are cracks due to metal fatigue of the half bead caused by an alternating load by a mouth opening phenomenon. When the cylinder head rises up relative to the cylinder block by the mouth opening phenomenon, the fastening load applied to the half bead by the compression load is released. During this, while sealing between the cylinder block and the cylinder head is constantly effected by the half bead through the restoration force of the half bead, cracks tend to occur in part of the half bead due to metal fatigue because compressive deformation and release in the vertical direction are repeated in units of several μm per second. Cracks tend to occur at the intersection points P1 and P2 and the corresponding parts at the opposite surface in the half bead. In particular, the occurrence rate is likely to be high in the case where the bead height Bh is higher than that of conventional Comparative Example sample C, as in Example sample J. Therefore, the crack strength needs to be determined. Hence, in validation test 2, a fatigue strength test was conducted using Comparative Example sample C2 and Example sample J17 having a bead width Bw of 1.5 mm and a bead radius of 3.0 mm, i.e. a use range expected to be of heavy use henceforth, and a bead height Bh of 0.65 mm, i.e. a high height which is likely to cause a low bead crack strength, to determine the improving effect of Example sample J over Comparative Example sample C2.

The fatigue strength was measured as follows: Using the same sealing limit tester as above and without using heating and oil load, vibration was repeatedly performed in a cycle of several tens of times per second by the universal tester assuming the combustion cycle during output of the internal combustion engine, and then the sample was removed from the sealing limit tester and whether cracks occurred was determined visually and by touch. As the pressing load of the universal tester, the half bead 116 was compressed under a prescribed load (upper limit load) and the output value of the gap sensor was set to 0 at the compression position, after which the load was released gradually until the gap sensor indicated the mouth opening amount (mouth opening Vol) to be determined, with the load when the mouth opening amount was reached being taken to be the lower limit load. Assuming the movement of the upper limit load, the lower limit load, and the upper limit load as one vibration, the mouth opening amount and the occurrence of cracks after a predetermined number of vibrations were repeatedly determined while changing the number of vibrations and the lower limit load, and the number of vibrations with which no cracks were found was taken to be the fatigue strength. For example, the measurement procedure for Example sample J17 in the case of a mouth opening amount of 180 μm was as follows: Example sample J17 was sandwiched between the upper and lower jigs under the upper limit load, and the load was gradually relaxed until the gap sensor indicated 180 μm to set the lower limit load, after which vibration was performed between the upper limit load and the lower limit load with cycles of several tens of times per second. When the number of vibrations reached $0.9 \times 10^4$ times, Example sample J17 was removed from the jigs and whether cracks occurred was determined visually and by touch. Since cracks were found in the half bead 116 at this point, new Example sample J17 was prepared, and vibrated under the same conditions. When the number of vibrations reached $0.8 \times 10^4$ times which is one rank down, Example sample J17 was removed and whether cracks occurred was determined visually and by touch. Since no cracks were found at this point, the bead fatigue strength when the mouth opening amount was 180 μm was determined as $0.8 \times 10^4$ times. The test was conducted by the same procedure for mouth opening amounts of 120 μm, 50 μm, 20 μm, 15 μm, 10 μm, 8 μm, 7 μm, 6 μm, and 5 μm. The test results of validation test 2 are listed in Table 7.

TABLE 7

| Mouth opening Vol (μm) | Example sample J17 | | | | Comparative Example sample C2 | | | |
|---|---|---|---|---|---|---|---|---|
| | No cracks OK | Cracks NG | | | No cracks OK | Cracks NG | | |
| 180 | 0.8 | 0.9 | | | 0.4 | 0.5 | | |
| 120 | 0.9 | 1 | | | 0.5 | 0.6 | | |
| 50 | 3 | 5 | | | 2 | 3 | | |
| 20 | 50 | 75 | 100 | | 10 | 20 | 50 | |
| 15 | 150 | 200 | 250 | | 50 | 100 | | |
| 10 | 300 | 350 | 400 | 500 | 100 | 150 | | |
| 8 | 600 | 650 | 700 | | 300 | 350 | 400 | |
| 7 | 1000 | | | | 400 | 450 | 500 | 600 |
| 6 | — | | | | 700 | 750 | | |
| 5 | — | | | | 1000 | | | |
| | Number of vibrations × $10^4$ times | | | | Number of vibrations × $10^4$ times | | | |

The test results in Table 7 revealed the following: Example sample J17 had longer crack life, i.e. the time until crack occurrence, than Comparative Example sample C2, in all mouth opening amounts. The mouth opening amount with which no cracks were found even when the sample was removed after ending the test without removing the sample from the jigs and checking it until a prescribed number of vibrations ($1000 \times 10^4$ times) were complete was 7 μm in Example sample J17, and 5 μm in Comparative Example sample C2. This also demonstrates that the improved half bead had sufficiently higher fatigue strength than the conventional half bead. Thus, the bead fatigue strength was enhanced by employing a half bead shape with a bead radius Br in a range of 2.0 mm to 3.5 mm.

<Validation Test 3>

We conducted validation test 3 in addition to validation tests 1 and 2, to determine a "decrease in sealing performance due to swelling and peeling of the sealant surface".

Upon mouth opening due to a head lift phenomenon during the combustion cycle of the internal combustion engine, the half bead is restored by the restoration force of the half bead and sealing between the cylinder block and the cylinder head is maintained. However, the oil is heated to high temperature by combustion, and also slight vibration of compression and release between the cylinder block and the cylinder head is repeated per several μm to a dozen μm by the alternating load, so that the lubricating oil of high temperature tends to reach near the bead intersection points P1 and P2 as the sealing line of the half bead, and, as a result of slight vibration of the cylinder block and the cylinder head at high temperature, "peeling or swelling" is likely to occur at the coating of the sealant on the surface of the metal substrate, in particular at the intersection points P1 and P2 and the corresponding parts at the opposite surface. Hence, this problem with the surface of the sealant needed to be checked, as well as validation tests 1 and 2.

To determine the occurrence of swelling and peeling of the sealant, a "coating peeling test" was conducted using the same sealing limit tester as above, and the number of vibrations until the surface of the metal substrate was exposed after the sealant coated on the metal substrate swelled or peeled in the part (intersection points P1 and P2) of the sealing line of the half bead was compared between Example sample J17 and Comparative Example sample C2. In the test, the oil reservoir provided in the lower jig was filled with lubricating oil, the lubricating oil was set to a heating state conforming to an actual engine by a heater, and set to a predetermined oil pressure state by an oil pressure regulator. Assuming the combustion cycle during output of the internal combustion engine, the compression and release of the sample were repeatedly performed several tens of times per second by the universal tester, and then the sample was removed from the universal tester and in particular the intersection points P1 and P2 and the corresponding parts at the opposite surface were checked visually and by touch. As the pressing load of the universal tester, the half bead was compressed under a prescribed load (upper limit load) and, in this state, the oil reservoir was filled with lubricating oil and the lubricating oil was heated to a prescribed temperature (150° C.) using a heater, a thermocouple, and a temperature controller, and vibration was performed 40 times per second between a prescribed upper limit and a prescribed lower limit. When the number of vibrations reached $5 \times 10^3$ times, the upper and lower jigs were separated to remove the sample, and whether the sealant peeled and whether the sealant swelled were determined visually and by touch. In the case where, with this number of times, the sealant swelled but did not peel to expose the metal surface, the vibration test was continued on the same sample. When the number of vibrations reached $5 \times 10^3$ times, whether the sealant swelled and whether the metal surface was exposed were determined visually and by touch in the same way as above. The test results for n=3 of each of Example sample J17 and Comparative Example sample C2 are listed in Table 8. In Table 8, "excellent" denotes that the surface of the sealant was unchanged, "good" denotes that part of the sealant swelled but the metal substrate was not exposed, and "poor" denotes that the sealant peeled and the metal substrate was exposed.

Moreover, changing the shape of the half bead did not adversely affect the sealant surface.

As can be understood from the results of these evaluation tests and validation tests, as a result of the bead width Bw of the half bead being in a range of 1.2 mm to 1.8 mm, the bead height Bh being in a range of 0.30 mm to 0.85 mm, and the bead radius Br being in a range of 2.0 mm to 3.5 mm, even when the compression of the half bead 16 is incomplete, the restoration force of the half bead 16 can be maintained to sufficiently increase the sealing limit value of the metal gasket 10, cracks on the half bead 16 can be prevented, and swelling and peeling of the sealant 19 with which the outer surface of the metal substrate 11 is coated can be prevented, with it being possible to maintain the sealing function of the metal gasket 10.

The present disclosure is not limited to the foregoing embodiment, and various changes can be made without departing from the scope of the present disclosure.

For example, although the foregoing embodiment describes, as an example, a 1.5-layer metal gasket 10 composed of one metal substrate 11 and one level difference adjusting plate 17, the present disclosure is not limited to such, and the metal gasket may have a 2.5-layer structure composed of two metal substrates 11 and one level difference adjusting plate 17.

Although the foregoing embodiment describes the case where the presently disclosed techniques are applied to the half bead 16 for sealing the lubricating oil hole 15, the present disclosure is not limited to such, and the presently disclosed techniques may be applied to a half bead for sealing another hole such as the cooling water hole 14 or a chamber hole.

REFERENCE SIGNS LIST 10 metal gasket
11 metal substrate
11a substrate body
12 cylinder bore hole
13 full bead
14 cooling water hole (liquid hole)
15 lubricating oil hole (liquid hole)
16 half bead
16a first bend portion
16b inclined plate portion
16c second bend portion
16d edge plate portion

TABLE 8

| Number of vibrations | Example sample J17 | | | Comparative Example sample C2 | | |
|---|---|---|---|---|---|---|
| ($\times 10^3$ times) | N1 | N2 | N3 | N1 | N2 | N4 |
| 5 | Excellent | Excellent | Excellent | Excellent | Excellent | Excellent |
| 10 | Excellent | Excellent | Excellent | Excellent | Excellent | Good |
| 15 | Excellent | Excellent | Excellent | Excellent | Excellent | Good |
| 20 | Excellent | Excellent | Good | Good | Good | Poor |
| 25 | Excellent | Good | Good | Good | Poor | Poor |
| 30 | Excellent | Good | Good | Poor | Poor | Poor |
| 35 | Good | Poor | Poor | Poor | Poor | Poor |

As can be seen from Table 8, the results of validation test 3 revealed the following: Example sample J17 had longer life until the swelling of the surface of the sealant and the exposure of the metal substrate than conventional Comparative Example sample C2, in all number of vibrations.

17 level difference adjusting plate
17a caulking portion
18 bolt hole
19 sealant
20 probe 40 half bead mold
40a upper mold
40b lower mold
40c chamfer
110 metal gasket
111 metal substrate
111a substrate body
112 cylinder bore hole
113 full bead
114 cooling water hole
115 lubricating oil hole
116 half bead
116a first bend portion
116b inclined plate portion
116c second bend portion
116d edge plate portion
117 level difference adjusting plate
118 bolt hole
119 sealant
120 probe
130 fine crack
131 streak mark
140 half bead mold
140a upper mold
140b lower mold
140c chamfer
150 half bead mold
150a upper mold
150b lower mold
150c chamfer
S1 upper surface of substrate body
L1 substrate body line
S2 upper surface of edge plate portion
L2 edge plate portion line
S3 upper surface of inclined plate portion
L3 inclined plate portion line
P1 intersection point
P2 intersection point
L4 vertical reference line
L5 line
L6 line
Tp test piece
C1 to C12 Comparative Example sample
t substrate thickness
Bw bead width
Bh bead height
Br bead radius
Kw width
Dr radius of chamfer
J1 to J49 Example sample

The invention claimed is:

1. A metal gasket configured to be installed between a cylinder head and a cylinder block, the metal gasket comprising
at least one metal substrate coated with a sealant on an outer surface thereof, and including a full bead for cylinder bore hole sealing and a half bead for liquid hole sealing,
wherein the half bead includes:
an inclined plate portion connected to a flat substrate body of the metal substrate through a first bend portion and inclined with respect to the substrate body; and
an edge plate portion connected to the inclined plate portion through a second bend portion and inclined with respect to the inclined plate portion, and
a radius at a convex surface of the first bend portion and a radius at a concave surface of the second bend portion are each in a range of 2.0 mm to 3.5 mm.

2. The metal gasket according to claim 1, wherein a height of the half bead is in a range of 0.35 mm to 0.85 mm.

3. The metal gasket according to claim 2, wherein a width of the half bead is in a range of 1.2 mm to 1.8 mm.

\* \* \* \* \*